(12) United States Patent
Lee et al.

(10) Patent No.: US 9,454,259 B2
(45) Date of Patent: Sep. 27, 2016

(54) MULTI-LEVEL COMMAND SENSING APPARATUS

(71) Applicant: SecuGen Corporation, Santa Clara, CA (US)

(72) Inventors: Dong Won Lee, San Jose, CA (US); Ye Seon Lee, San Jose, CA (US); Jae Ho Kim, San Jose, CA (US); Jae Hyeong Kim, San Ramon, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

(21) Appl. No.: 15/143,303

(22) Filed: Apr. 29, 2016

(65) Prior Publication Data

US 2016/0239150 A1    Aug. 18, 2016

Related U.S. Application Data

(60) Provisional application No. 62/274,772, filed on Jan. 4, 2016.

(51) Int. Cl.
| | |
|---|---|
| *G06F 3/041* | (2006.01) |
| *G06F 3/042* | (2006.01) |
| *G06F 21/36* | (2013.01) |
| *G06F 21/62* | (2013.01) |
| *G06K 9/00* | (2006.01) |

(52) U.S. Cl.
CPC ........... *G06F 3/0416* (2013.01); *G06F 3/0414* (2013.01); *G06F 3/0421* (2013.01); *G06F 21/36* (2013.01); *G06F 21/6218* (2013.01); *G06K 9/0002* (2013.01); *G06K 9/00033* (2013.01); *G06F 2203/04101* (2013.01); *G06F 2203/04106* (2013.01)

(58) Field of Classification Search
CPC .... G06F 3/0416; G06F 3/0421; G06F 21/36; G06F 21/6218; G06F 3/0414; G06F 2203/04101; G06F 2203/0416; G06K 9/0002; G06K 9/00033

See application file for complete search history.

(56) References Cited

U.S. PATENT DOCUMENTS

| | | | | |
|---|---|---|---|---|
| 2002/0191029 | A1* | 12/2002 | Gillespie | G06F 3/0488 715/810 |
| 2004/0125053 | A1* | 7/2004 | Fujisawa | G06F 1/1613 345/76 |
| 2005/0212733 | A1* | 9/2005 | Tateuchi | G06F 3/0412 345/81 |
| 2008/0012835 | A1* | 1/2008 | Rimon | G06F 3/038 345/173 |
| 2008/0284925 | A1* | 11/2008 | Han | G06F 3/0425 349/12 |
| 2011/0031042 | A1* | 2/2011 | Wu | G06F 3/0412 178/18.06 |
| 2011/0115767 | A1* | 5/2011 | Senda | G06F 3/0412 345/207 |

(Continued)

*Primary Examiner* — Darren B Schwartz
(74) *Attorney, Agent, or Firm* — Silicon Valley Patent Group LLP

(57) ABSTRACT

Methods and systems are provided for a multi-level command sensing apparatus that includes a matrix of light sensors and light sources and that may also serve as the display. In one embodiment, a method for performing multi-level command sensing by a multi-level command sensing apparatus comprises detecting a leakage current corresponding to changes of light conditions on a display by one or more light sensors of the multi-level command sensing apparatus, determining an action performed by a user based on the changes of light conditions on the display by a controller of the multi-level command sensing apparatus, determining a command based on the action performed by the controller of the multi-level command sensing apparatus, and executing the command by the controller of the multi-level command sensing apparatus.

18 Claims, 24 Drawing Sheets

(56) References Cited

U.S. PATENT DOCUMENTS

| | | | |
|---|---|---|---|
| 2011/0205163 A1* | 8/2011 | Hinckley | G06F 3/0483 345/173 |
| 2012/0113061 A1* | 5/2012 | Ikeda | G06F 3/041 345/175 |
| 2012/0127128 A1* | 5/2012 | Large | G06F 3/0425 345/175 |
| 2012/0312956 A1* | 12/2012 | Chang | G06F 3/017 250/201.1 |
| 2013/0120319 A1* | 5/2013 | Givon | G06F 3/0425 345/175 |
| 2014/0253427 A1* | 9/2014 | Gruhlke | G06F 3/017 345/156 |
| 2014/0355846 A1* | 12/2014 | Lee | G06K 9/0004 382/124 |
| 2015/0002471 A1* | 1/2015 | Mankowski | G06F 3/0416 345/175 |
| 2016/0054851 A1* | 2/2016 | Kim | G06F 3/0488 345/174 |

\* cited by examiner

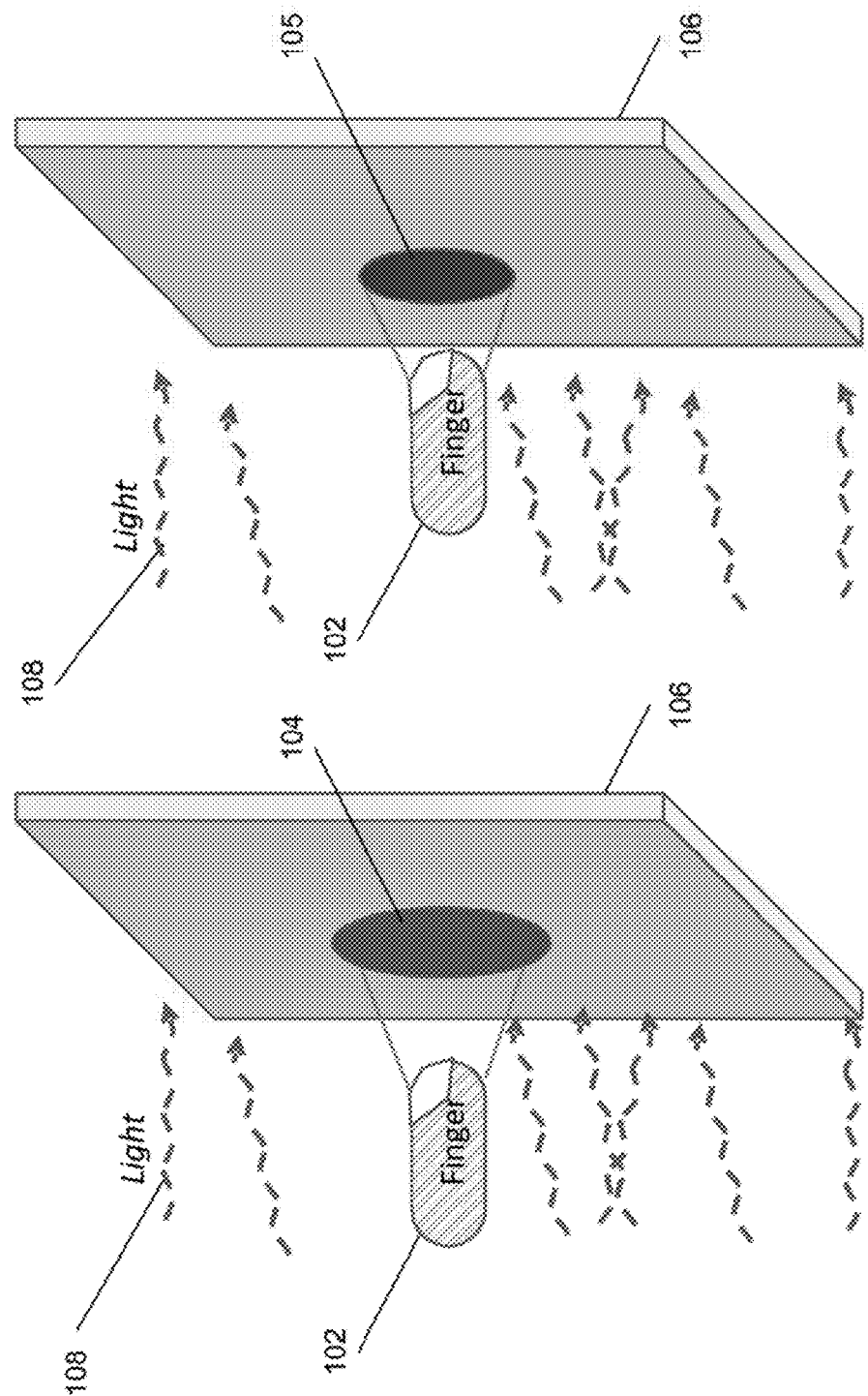

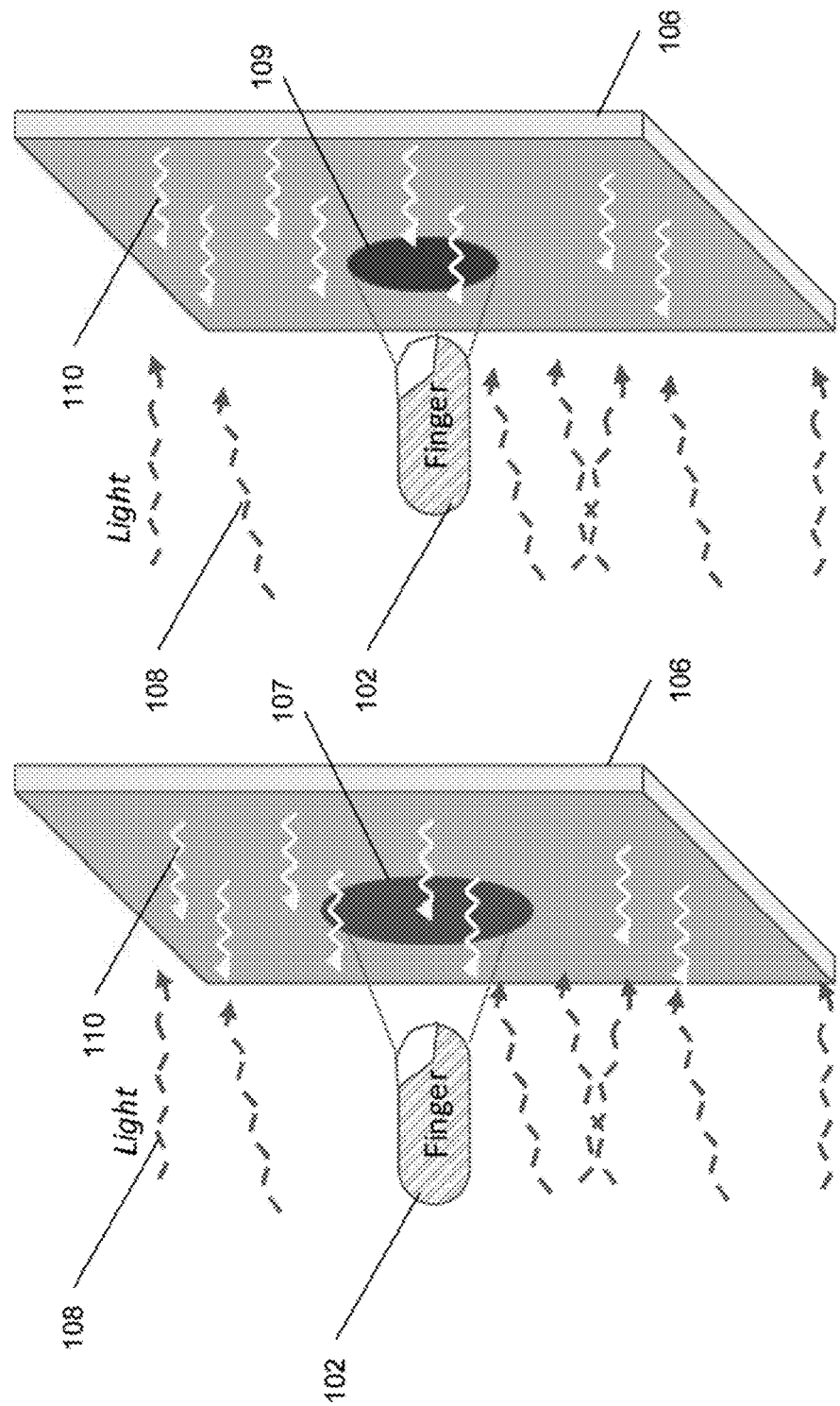

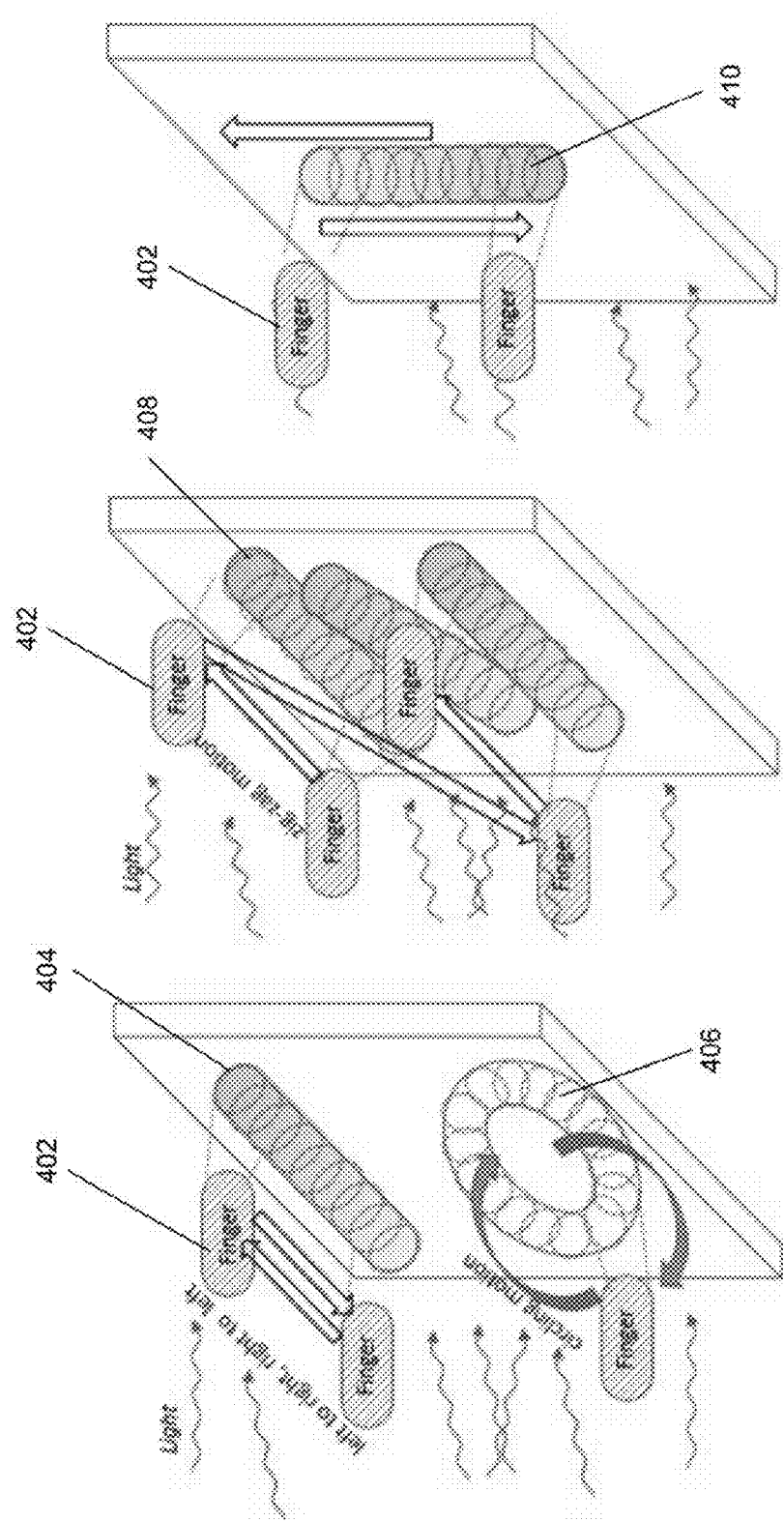

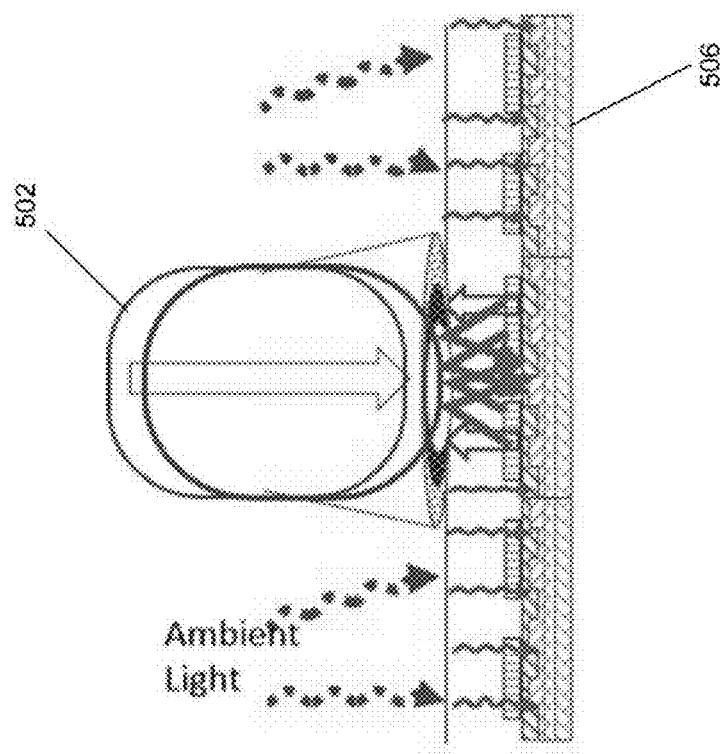
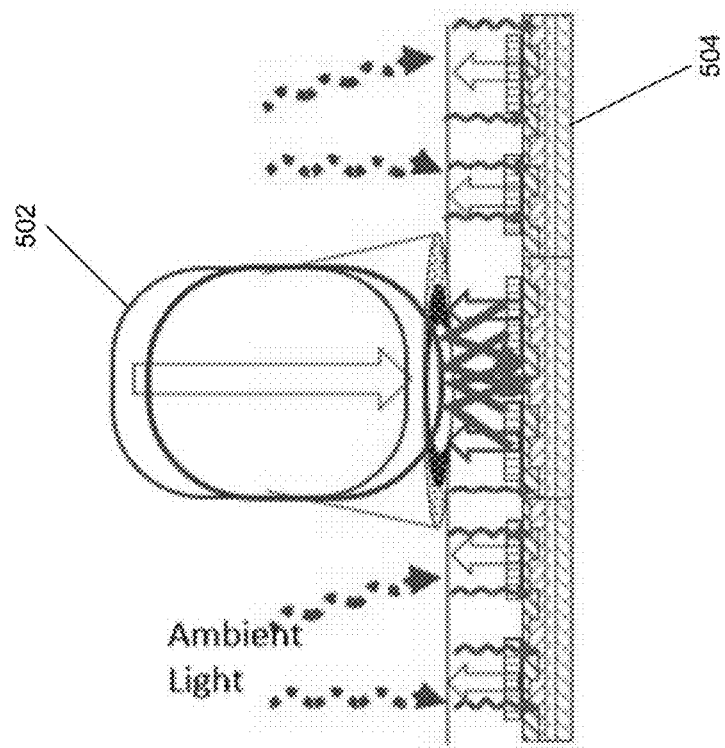
FIG. 5B
FIG. 5A

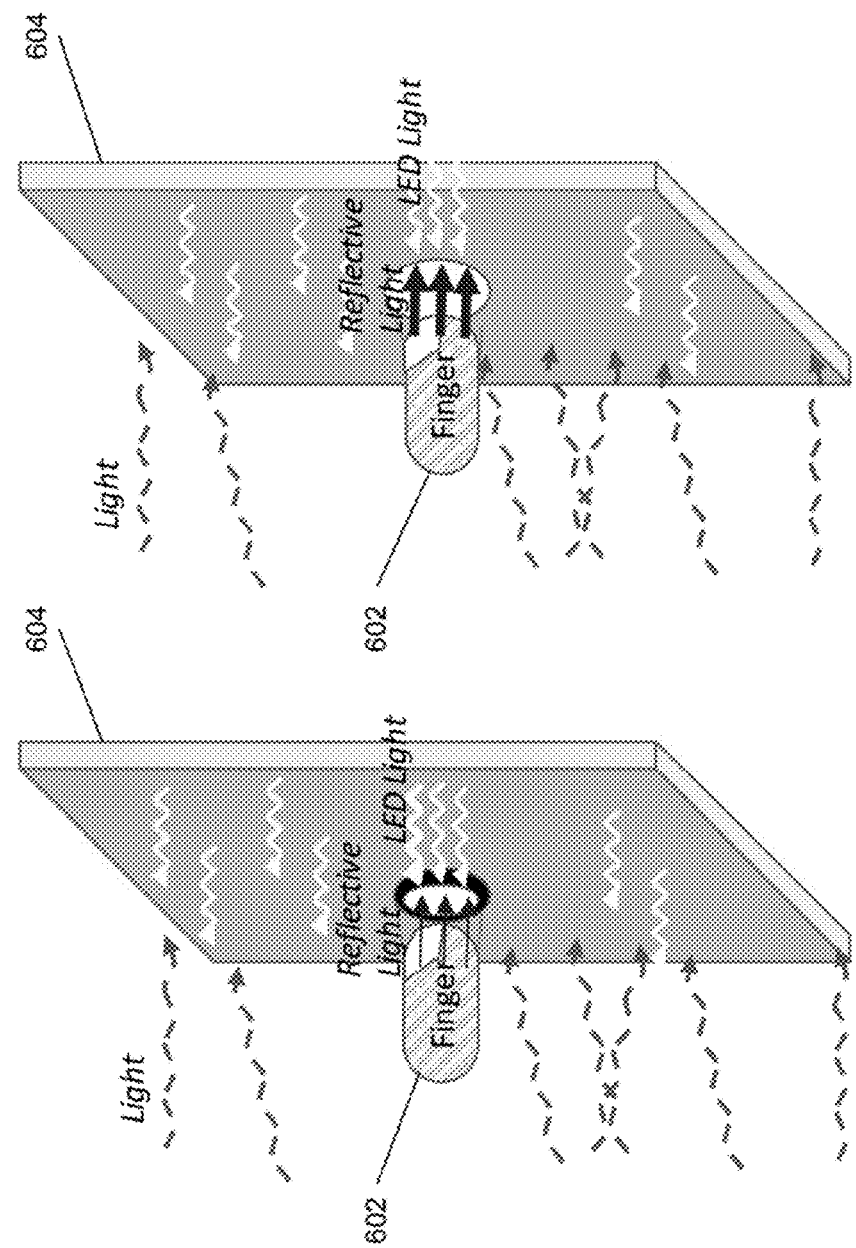

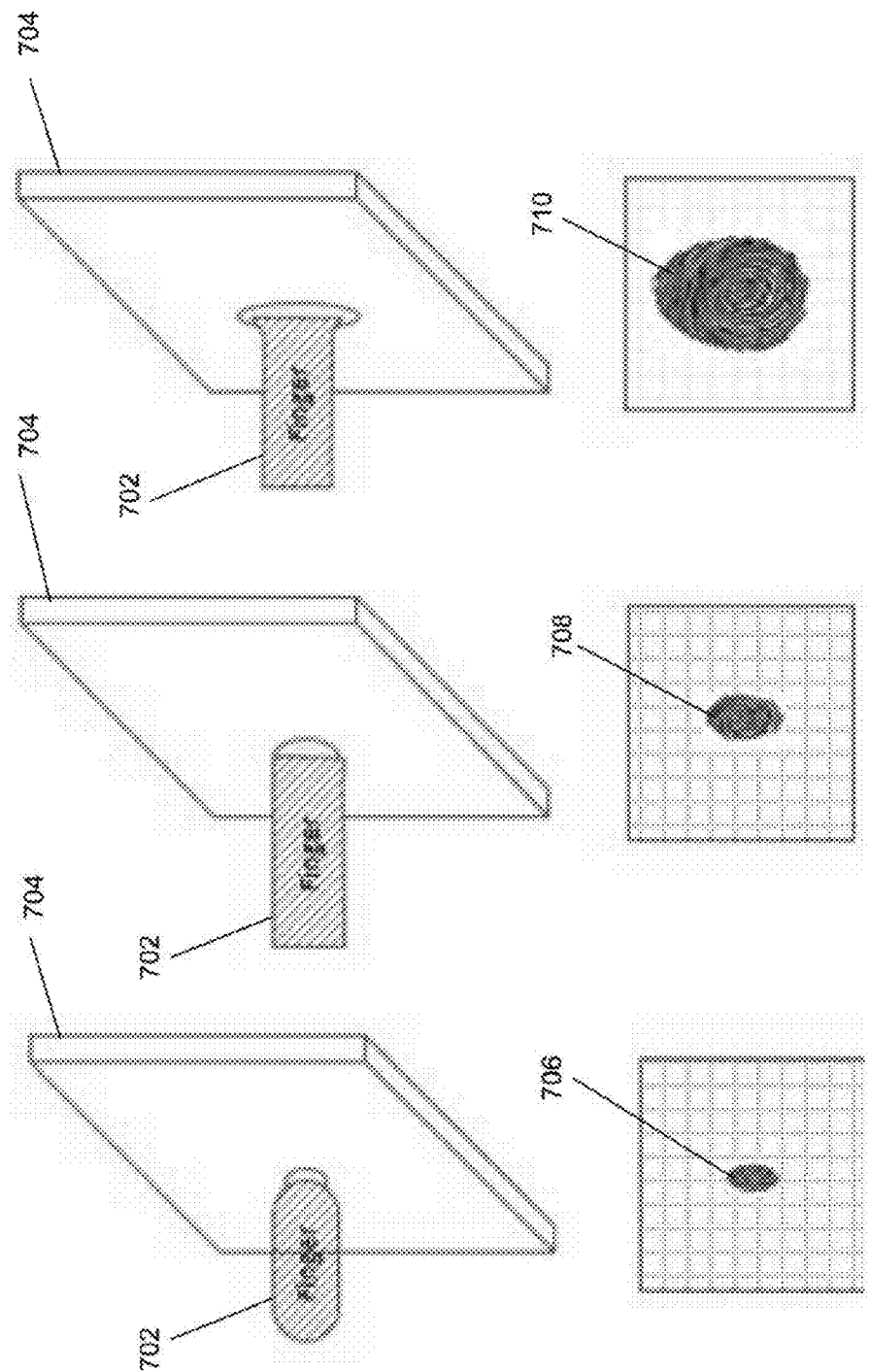

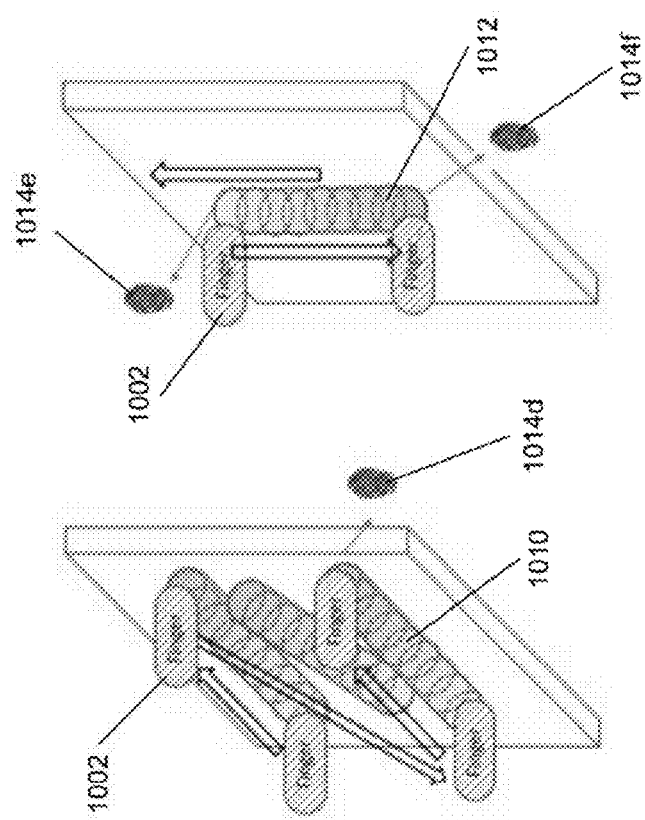
FIG. 10C
FIG. 10D
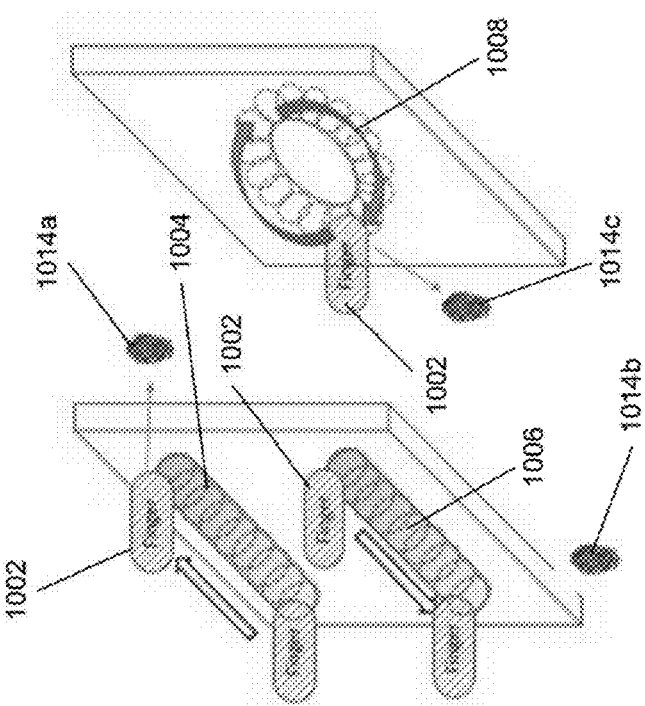
FIG. 10A
FIG. 10B

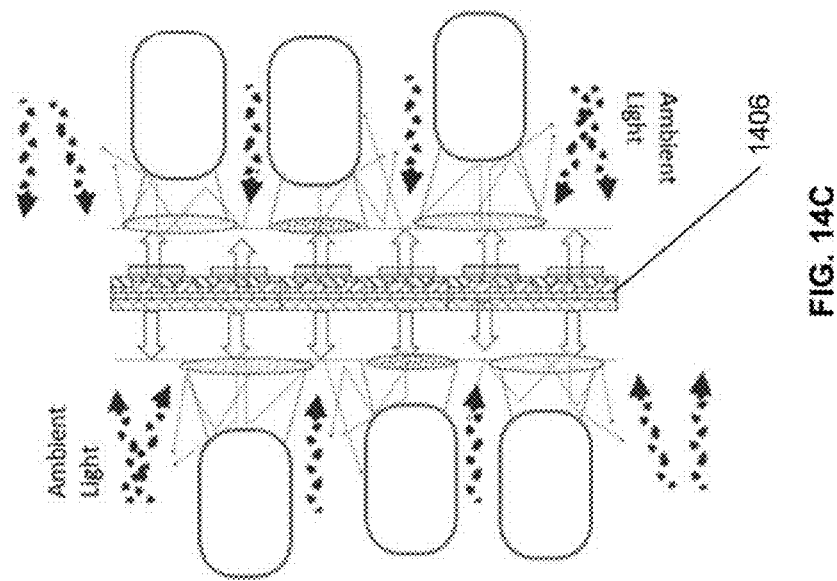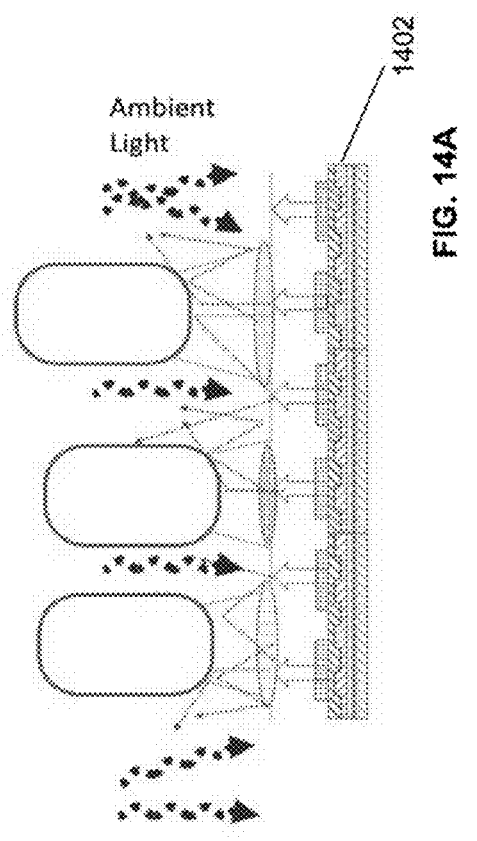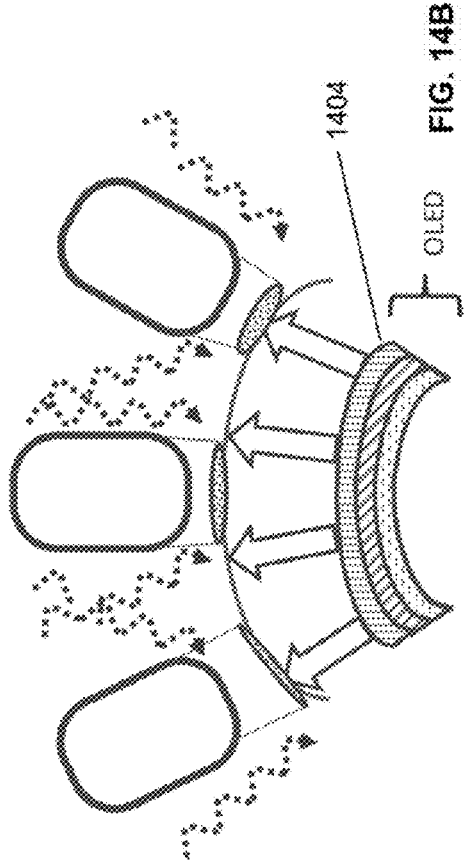

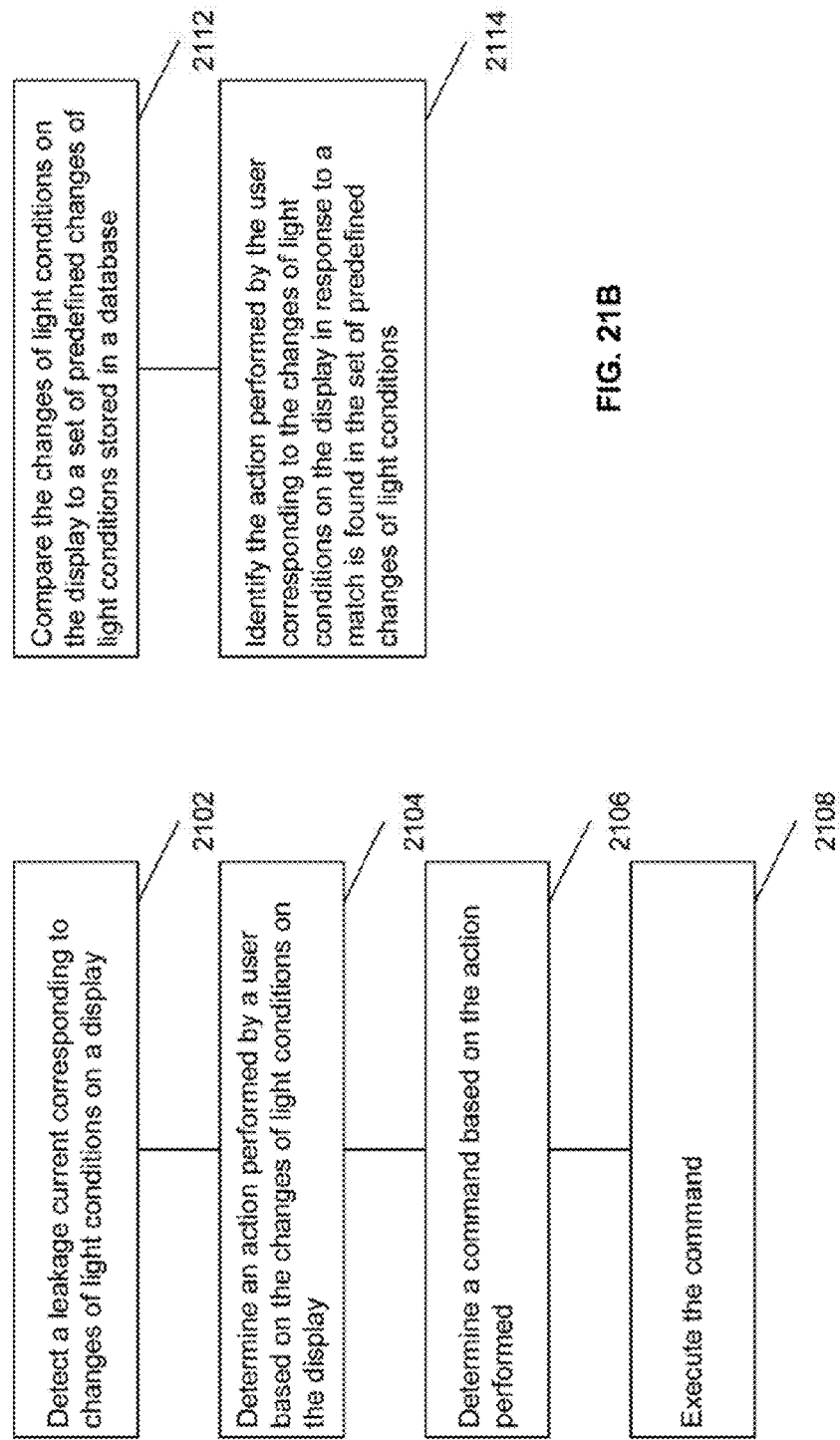

MULTI-LEVEL COMMAND SENSING APPARATUS

CROSS REFERENCE TO RELATED APPLICATION

This application claims the benefit of U.S. provisional patent application No. 62/274,772, "Multi-Level Command Sensing Apparatus," filed Jan. 4, 2016, which is assigned to the assignee hereof. The aforementioned United States patent application is hereby incorporated by reference in its entirety.

FIELD

The present invention relates to the field of user interface with a display. In particular, the present invention relates to a multi-level command sensing apparatus.

BACKGROUND

In conventional user interfaces with mobile devices, a user typically controls a mobile device by using one or more fingers to touch or press a display or keys and buttons of the mobile device. Such touches or presses are converted into user inputs or commands that may be configured to control the mobile device. It is beneficial to allow users to provide user commands as the user approaches, prior to touching, the screen of the mobile device. It is also beneficial to allow users to provide multi-levels of user commands with and/or without touching the screen of the mobile device.

SUMMARY

Methods and systems are provided for a multi-level command sensing apparatus that includes a matrix of light sensors and light sources and that may also serve as the display. In one embodiment, a method for performing multi-level command sensing by a multi-level command sensing apparatus comprises detecting a leakage current corresponding to changes of light conditions on a display by one or more light sensors of the multi-level command sensing apparatus, determining an action performed by a user based on the changes of light conditions on the display by a controller of the multi-level command sensing apparatus, determining a command based on the action performed by the controller of the multi-level command sensing apparatus, and executing the command by the controller of the multi-level command sensing apparatus.

According to aspects of the present disclosure, when a finger, hand, palm, or object hovers or moves above a display (also referred to as a display panel, panel, or screen) or approaches the display before making direct contact, the controller can be configured to determine an approximate position and movement of the finger or object from the changes in the amount of light detected by the light sensors caused by the shadow, or shade, cast by the hovering object onto the panel. The light sources of the display may be either on or off. The light sensors can detect less light in the shaded area created by the hovering object. The light sources of the display may be turned on when the amount of ambient light detected is less than a certain predetermined amount.

Methods and systems are provided for a multi-level command sensing apparatus. In one embodiment, a method for determining movement of shade while operating under hovering mode includes a light detection sequence. As an object moves over the panel in a 2-dimensional plane parallel to the panel, the shade caused by the object also moves in certain directions corresponding to the movement of the object, including left to right, right to left, top to bottom, or bottom to top. The movement can also be diagonal or circular. The movement can also be perpendicular to the panel, for example, as an object moves closer to or away from the panel. The movement can also be combination of the above movements in 3-dimensional space. The movements can be classified as 1) movement parallel to the panel 2) movement perpendicular to the panel, and 3) a combination of movement parallel and perpendicular to the panel. To recognize the movement as an input action to execute a certain command, the system can have a movement interpreter which can compare the movement to a list of predetermined patterns or reference values.

Methods and systems are provided for a multi-level command sensing apparatus. In one embodiment, a method for determining touch includes a light detection sequence. As an object approaches the panel, the shaded area becomes darker and smaller. When the shaded area becomes smaller than a predetermined size, smaller than a certain percentage or ratio from its initially detected size, darker than a certain percentage or ratio of its initially detected darkness, or darker than a predetermined amount, the panel can be configured to brighten the light sources at the shaded area before the object touches the panel. At the moment of touch, if it occurs, the light sensors can detect a brightening of the initially shaded area, due to the reflection and scattering of the light from the light sources off the object touching the screen, and thus can be able to determine when and in what location on the panel the touch input has occurred. If the brightening does not occur, the object has approached the screen to a certain proximity but has not made direct contact.

In another embodiment, a multi-level command sensing apparatus comprises a display, one or more light sensors configured to detect a leakage current corresponding to changes of light conditions on the display, and a controller comprising one or more processors, where the controller is configured to: determine an action performed by a user based on the changes of light conditions on the display, determine a command based on the action performed, and execute the command determined.

According to aspects of the present disclosure, the changes of light conditions comprise a sequence of shadows detected on the display, and the action performed by the user comprises a sequence of hovering motions without touching the display. The changes of light conditions comprise a sequence of brightened shadows detected on the display, and the action performed by the user comprises a sequence of touches on the display. The sequence of brightened shadows may be caused by reflected light and scattered light from an object touching the display. The sequence of touches includes a sequence of low pressure touches predefined by the designer or user. The sequence of touches includes a sequence of high pressure touches predefined by the designer or user. The sequence of touches can also include a sequence of multiple levels of pressure touches predefined by the designer or user.

According to aspects of the present disclosure, the controller may be further configured to compare the changes of light conditions on the display to a set of predefined changes of light conditions stored in a database of the multi-level command sensing apparatus; and identify the action performed by the user corresponding to the changes of light conditions on the display in response to a match being found in the set of predefined changes of light conditions.

According to aspects of the present disclosure, the controller may be further configured to compare the action performed by the user to a set of predefined actions stored in a database of the multi-level command sensing apparatus, and identify the command corresponding to the action performed by the user in response to a match being found in the set of predefined actions.

According to aspects of the present disclosure, the controller may be further configured to authenticate the user based on the sequence of touches on the display, by continuously authenticating the user during an access to security sensitive information using the multi-level command sensing apparatus, and terminate the access to the security sensitive information in response to one or more mismatches found in the continuously authenticating process.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIGS. 1A-1D illustrate methods of detecting changes of light conditions on a display according to aspects of the present disclosure.

FIGS. 4A-4C illustrate methods of determining actions performed by a user based on the changes of light conditions on the display according to aspects of the present disclosure.

FIGS. 5A-5B illustrate methods of detecting changes of light conditions as an object approaches and touches a display according to aspects of the present disclosure.

FIGS. 6A-6D illustrates methods of detecting changes of light conditions as finger approaches and touches a display according to aspects of the present disclosure.

FIGS. 7A-7C illustrate methods of sensing multiple levels of pressure as a display is being pressed according to aspects of the present disclosure.

FIGS. 10A-10D illustrates other examples of authenticating a user according to aspects of the present disclosure.

FIGS. 14A-14C illustrate examples of OLEDs with light sensors for detecting a leakage current corresponding to changes of light conditions according to aspects of the present disclosure.

FIGS. 21A-21D illustrate methods of performing multi-level command sensing according to aspects of the present disclosure.

DESCRIPTION OF EMBODIMENTS

Figure 2A:
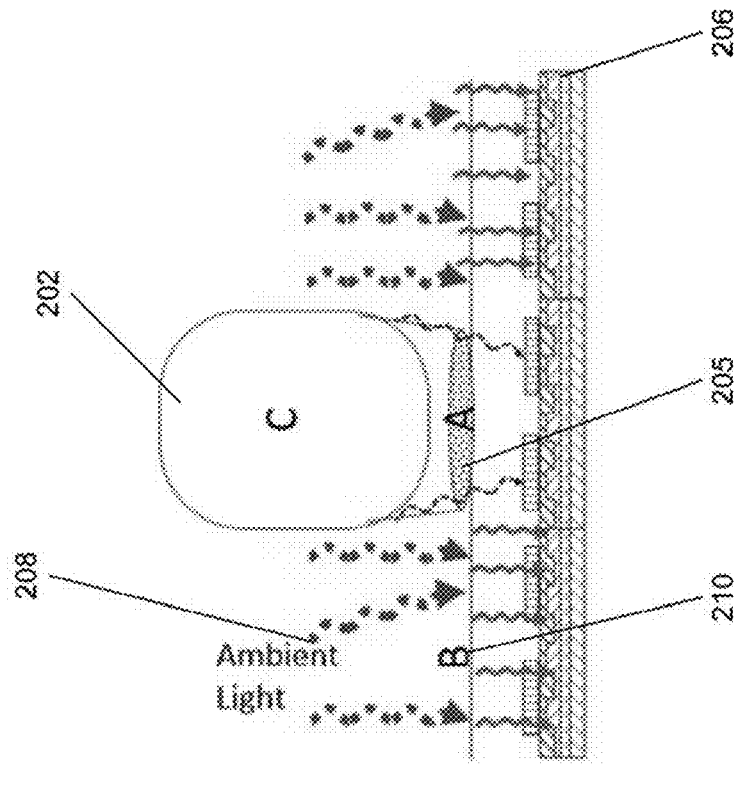
FIGS. 2A-2B illustrate methods of detecting changes of light conditions on a display according to aspects of the present disclosure.

Methods and systems are provided for a multi-level command sensing apparatus that includes a matrix of light sensors and light sources that may also serve as the display. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

According to aspects of the present disclosure, methods and systems are provided for a touch sensing apparatus. In one embodiment, a method for determining touch includes a light detection sequence. As an object approaches a display, the shaded area created by the object on the panel becomes darker and smaller. When the shaded area becomes smaller than a predetermined size, for example smaller than a certain percentage or ratio from its initially detected size, darker than a certain percentage or ratio of its initially detected darkness, or darker than a predetermined value, light sources embedded underneath the shaded area in the display will be turned on to detect a touch. A touch may be recognized when one or more light sensors, detect a brightened area in the initially shaded area, due to the reflection and scattering of the light from the light sources off the surface of the object touching the screen. As a result, the touch sensing apparatus can determine when and at what location on the display the touch input has occurred. Alternatively, if the brightened area in the initially shaded area is not detected, it may be determined that the object has approached the display to certain proximity but has not yet made direct contact with the display.

In another embodiment, a method for performing multi-level command sensing in a multi-level command sensing apparatus includes a light detection sequence. The light sources are turned on randomly or sequentially. One or more cells or sub pixels turned on at once. As the object approaches the panel, the shaded area becomes darker and smaller. At the moment of touch, if it occurs, the light sensors can detect a brightening of the initially shaded area, due to the reflection and scattering of the light from the light sources off the object touching the screen, and thus can be able to determine when and in what location on the panel the touch input has occurred. If the brightening does not occur, the object has approached the screen to certain proximity but has not made direct contact.

Once a controller has determined that contact has been made, the controller may begin fingerprint capture, using methods described in following paragraphs. Based on the area of the image of the fingerprint that is captured, the controller can be configured to determine the relative pressure applied by the finger. The larger the area of the fingerprint captured, the higher the pressure that has been applied. The same procedure can be applied to determine pressure for a stylus with a soft tip, made of material such as rubber.

In another embodiment, an apparatus for determining shade movement, hovering and validity of a fingerprint includes a light refracting device (light refractor), a light source, a light collecting device, and a controller. The light refracting device can, for example, be an active matrix organic light emitting diode (AMOLED) panel structure with reverse current measurement and amplification circuitry, and include an imaging surface and a viewing plane. Incident light from the light source is projected directly or indirectly onto the imaging surface to create an image of the patterned object from the projected light onto the viewing plane. The apparatus is configured to have a thin form factor, which may be flexible or conformable, compared to conventional optical fingerprint acquisition apparatuses. The AMOLED panel includes the light source panel as well as light collecting devices. The multi-level command sensing apparatus can be implemented as an in-cell structure.

In another embodiment, an apparatus for determining shade movement, hovering and validity of a fingerprint includes a light refracting device (light refractor), a light source, a light collecting device, and a controller. The light refracting device can, for example, be a thin-film transistor (TFT) panel and include an imaging surface, a light receiving surface, a viewing plane, and light collecting devices. The light source can be an individually addressable panel of discrete light sources, for example, a liquid crystal display (LCD) panel or an AMOLED panel. Incident light from the light source is projected through the light receiving surface and projected directly or indirectly onto the imaging surface to create an image of the patterned object from the projected light onto the viewing plane. The apparatus is configured to have a thin form factor, which may be flexible or conformable, compared to conventional optical fingerprint acquisition apparatuses. The TFT panel may be implemented as an add-on panel that is placed on top of the light source panel.

In another embodiment, a method for determining pressure or size of a fingerprint includes detecting the number of pixels or sub pixels that are brightened. The brightened pixels, also referred to as brightened shadows, are detected by determining which pixels have a higher leakage current than a predetermined value or a predetermined percentage or ratio of its initial value. The larger the number of brightened pixels, the higher the pressure that has been applied. In one embodiment, certain numbers of brightened pixels correspond to certain pressures in some fixed relationship determined in advance. In another embodiment, the number of brightened pixels is compared to the number of brightened pixels initially detected when the panel is touched. A larger number of brightened pixels than the number of brightened pixels initially detected corresponds to a higher pressure. In another embodiment, the number of brightened pixels is compared to some reference touch input by the user, calibrated in advance. A larger number of brightened pixels than the number of brightened pixels determined in the reference touch correspond to a higher pressure. In another embodiment, the number of brightened pixels is compared to touch input data collected by the device as the device is used over time. A certain characteristic of the data, such as its average, or some other reference determined by processing the data using various methods may be used. A larger number of brightened pixels than the number determined by processing the data corresponds to a higher pressure. A smaller number of brightened pixels than the number determined by processing the data corresponds to a smaller pressure.

In another embodiment, a method for determining size and validity of a fingerprint includes determining a set of light sources from a plurality of light sources for emitting light to a fingerprint, determining a set of sensor zones from a plurality of sensor zones for sensing scattered light from the fingerprint, determining a minimum distance between a sensor zone and a light source for sensing selective scattered light from the fingerprint, emitting light from the set of light sources to generate the scattered light from the fingerprint, sensing the scattered light in the set of sensor zones, and determining a validity of the fingerprint using the scattered light sensed in the plurality of sensor zones.

The light refracting device supports basic touch screen functionality, as well as hovering object detection and gesture recognition, and pressure level detection using a combination of ambient light and the active matrix display as light sources.

FIGS. 1A-1B illustrate a method of detecting changes of light conditions on a display with the display being turned off according to aspects of the present disclosure. In the example of FIG. 1A, with a finger 102 or object hovering above the panel 106 at a distance larger than 0 but close enough to cast a detectable shadow, for example approximately between 30 millimeters (mm) to 1 mm, the presence of the finger 102 or object creates a shadow 104 on the panel due to the presence of ambient light 108 in the background. The shadow 104 on the panel 106 produces a difference in the leakage current between the shadowed area and the bright area measured by a matrix of light sensors embedded in the panel 106. The apparatus can then determine the position of the finger 102 or object based on the location of the shadow 104.

An object hovering farther away from the panel may produce a smaller difference in leakage current between the shadowed area it creates on the panel and the brighter area outside the shadowed area, than the difference produced with the object hovering closer to the panel. The panel may be configured to detect a hovering object if the difference in leakage current between the shadowed area and the brighter area around the shadow is larger than a certain value that may be determined in advance or calculated based on present conditions.

Multiple surrounding objects may cast both wanted and unwanted shadows onto the panel. The panel may be configured to detect multiple shadows or only detect a certain number of the darkest shadows cast onto the panel.

Similarly in FIG. 1B, the hovering object 102 creates a shadow 105 on the panel 106 and a lower leakage current at the shadowed area relative to the area around the shadow. As the object 102 approaches closer to the panel 106 (also referred to as the screen or the display), the shadow 105 becomes darker and creates an even lower leakage current than the example as in FIG. 1A.

FIGS. 1C-1D illustrate a method of detecting changes of light conditions on a display with the display being turned on according to aspects of the present disclosure. As shown in FIG. 1C, the panel 106 is turned on, which emits light 110 from the panel 106. With a finger 102 or object hovering above the panel 106 at a distance approximately between 30 mm to 1 mm, the presence of the finger 102 or object creates a shadow 107 on the display panel due to the presence of ambient light 108 in the background and the emitted light 110. The shadow 107 on the panel 106 produces a difference in the leakage current between the shadowed area and the bright area measured by a matrix of light sensors embedded in the panel 106. The apparatus can then determine the position of the finger 102 or object based on the location of the shadow 107.

Similarly in FIG. 1D, the hovering object 102 creates a shadow 109 on the panel 106 and a lower leakage current at the shadowed area relative to the area around the shadow. As the object 102 approaches closer to the panel 106 (also referred to as the screen or the display), the shadow 109 becomes darker and creates an even lower leakage current than the example as in FIG. 1C.

According to aspects of the present disclosure, the touch panel may include a light source panel, which may also be a display screen, along with a matrix of light sensors. The matrix of light sensors detect and locate the position of a finger or stylus placed on the panel to provide touch screen functionality on par with or surpassing other methods.

A controller can be configured to detect the movement of hovering objects by detecting significant changes in amount of light detected either throughout the panel, or limited to a certain region. The changes of light conditions can be used to determine the position and/or movement of the hovering object.

Figure 2B:
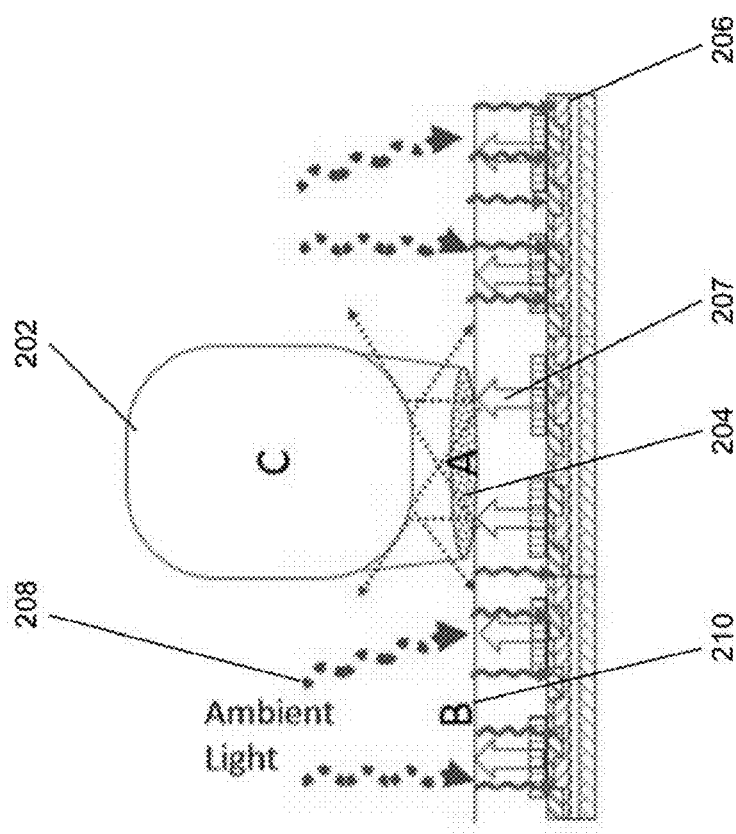

FIG. 2A illustrates a method of detecting changes of light conditions with the display being turned on, and FIG. 2B illustrates a method of detecting changes of light conditions with the display being turned off according to aspects of the present disclosure. The examples of FIGS. 2A-2B illustrate a finger or object 202 hovering near but not yet directly touches the display 206. In the presence of ambient light 208, the leakage current detected by light sensors in the exposed area 210, labeled as area B, may be larger than the leakage current detected in the shaded area 204, labeled as area A, by the finger 202 or object. In FIG. 2A, the display 206 may be lit by one or more illumination lights 207 from one or more light sources. In FIG. 2B, the display 206 may be turned off, i.e. not lit by one or more illumination lights, and the method of detecting changes of light conditions with the display may still be implemented.

Figure 3B:
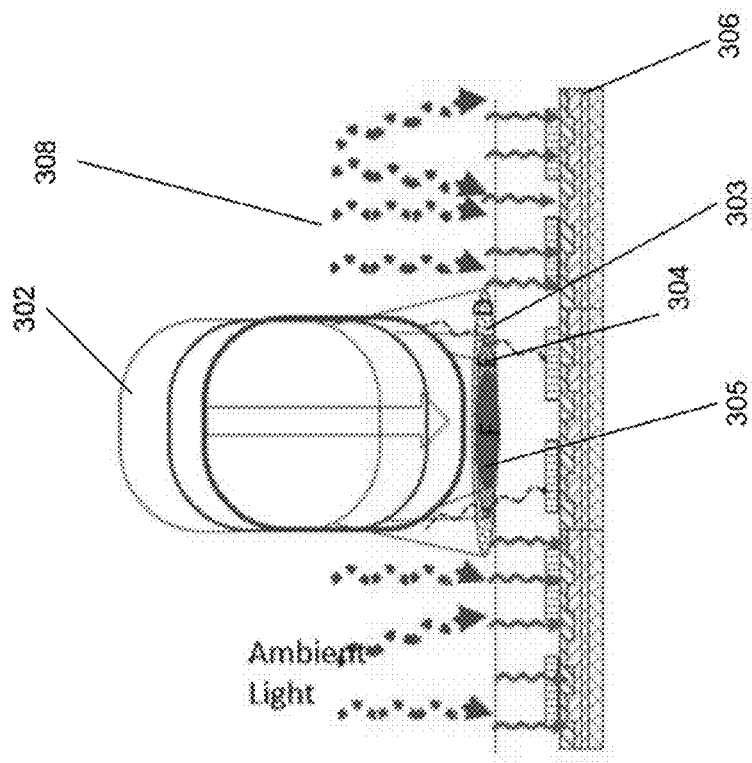
FIG. 3A-3B illustrate methods of detecting changes of light conditions as an object approaches a display according to aspects of the present disclosure.
Figure 3A:
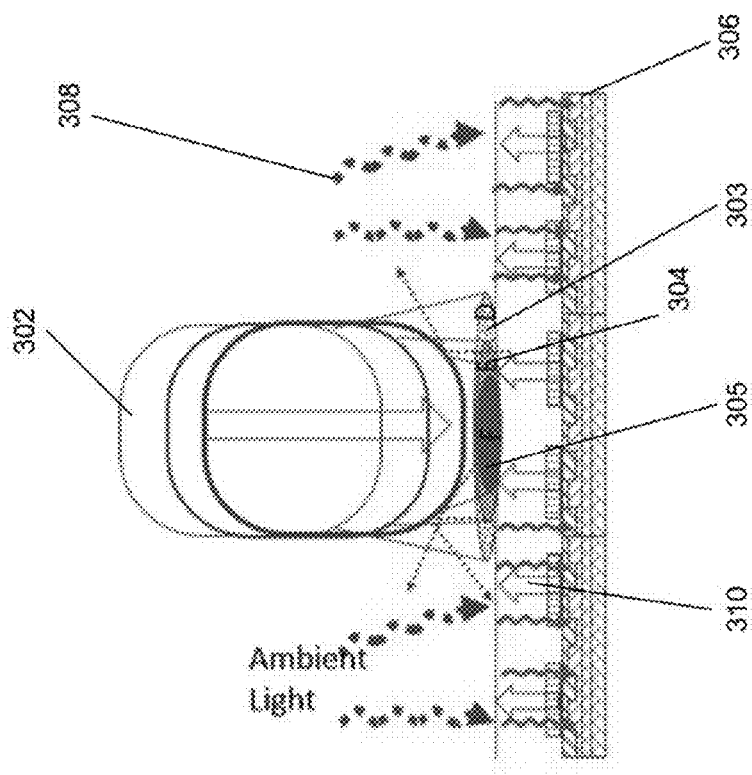

FIG. 3A illustrates a method of detecting changes of light conditions as an object approaches a display with the display being turned on, and FIG. 3B illustrates a method of detecting changes of light conditions as an object approaches a display with the display being turned off according to aspects of the present disclosure. FIGS. 3A-3B illustrate the changes a controller may observe as the finger or object 302 approaches the panel. As the finger or object gets closer, for example moving from a distance of 25 mm to 5 mm, to the screen 306, the shadow of the finger or object on the screen becomes darker and darker (D→F), causing less leakage current at the shadowed area. The leakage current detected at region D 303 is larger than the leakage current detected at region E 304, which is larger than the leakage current detected at region F 305. The sensor can detect the leakage current variation and change to "touching" mode when the shadow becomes smaller than a predetermined size, or produces a leakage current smaller than a predetermined amount. In FIG. 3A, with the display is turned on, with arrows 310 represent light being emitted from panel 306.

In some implementations, such as the embodiment shown in FIG. 3B, even with the panel light source off, with the presence of ambient light, a controller can be configured to detect hovering objects and thus execute commands even with the display off. For example, swiping a hand above the screen from one side to another (left to right or right to left) can cause the matrix of sensors to sense a change in ambient light being detected from one side of the screen to the other. This pattern can be utilized in a music player application to correspond to changing a song to either the next or the previous song, depending on the direction of the swipe. Swiping a hand above the screen from the top of the screen to the bottom of the screen, or from the bottom of the screen to the top of the screen can be programmed to correspond to adjusting the volume up or down.

FIGS. 4A-4C illustrate methods of determining actions performed by a user based on the changes of light conditions on the display according to aspects of the present disclosure. FIGS. 4A-4C illustrate examples of different gestures that may be produced by a hovering finger or object 402. A controller can be configured to recognize the gestures by the movement of the shadow (for example 404, 406, 408, or 410) on the panel, which produces differences in leakage current measured by the light sensors. Gesture recognition can be performed while hovering or touching the screen. Various gestures or a combination of gestures can be programmed to represent various commands. Detection of a stationary hovering object may also be configured to correspond to various commands depending on the situation. For example, detection of a hovering object over a link or button on the screen for a certain amount of time may be configured to open a secondary menu related to the link or button.

According to aspects of the present disclosure, specific gestures or actions in a certain sequence, such as swiping above the screen from left to right, right to left, top to bottom, bottom to top, left to right to left, right to left to right, top to bottom to top, bottom to top to bottom, a direct touch motion gesture followed by pressure detection, circling motion, etc., or some and any combination of the above can be used to correspond to various commands during general use or to certain actions or directions in a game.

FIG. 5A illustrates a method of detecting changes of light conditions as an object approaches and touches a display with the display being turned on, and FIG. 5B illustrates a method of detecting changes of light conditions as an object approaches and touches a display with the display being turned off according to aspects of the present disclosure. FIG. 5A illustrates the differences in leakage current that may be observed by a controller when a finger or object 502 makes direct contact with the panel 504 when the display is on. FIG. 5B illustrates the differences in the leakage current that may be observed by a controller when a finger or object 502 makes direct contact with the panel 504 when the display is off.

According to aspects of the present disclosure, when the display is off, the device may be in "standby" mode and ready to accept input to wake up the display, after which the device may be unlocked according to various user verification methods. With the presence of ambient light, the matrix of sensors may be able to detect the presence of a finger on the screen for a pre-designated period of time, after which the display can be woken up to read and verify a fingerprint. Other methods may also be used to initially detect the presence of a finger on the screen for the designated period of time—for example, a pressure sensor can be used. Alternatively, other methods can be used to initially signal the device to wake up in order to turn on the display and read a fingerprint—for example, pressing the home or power button, or double tapping the screen.

Figures 6A, 6B:
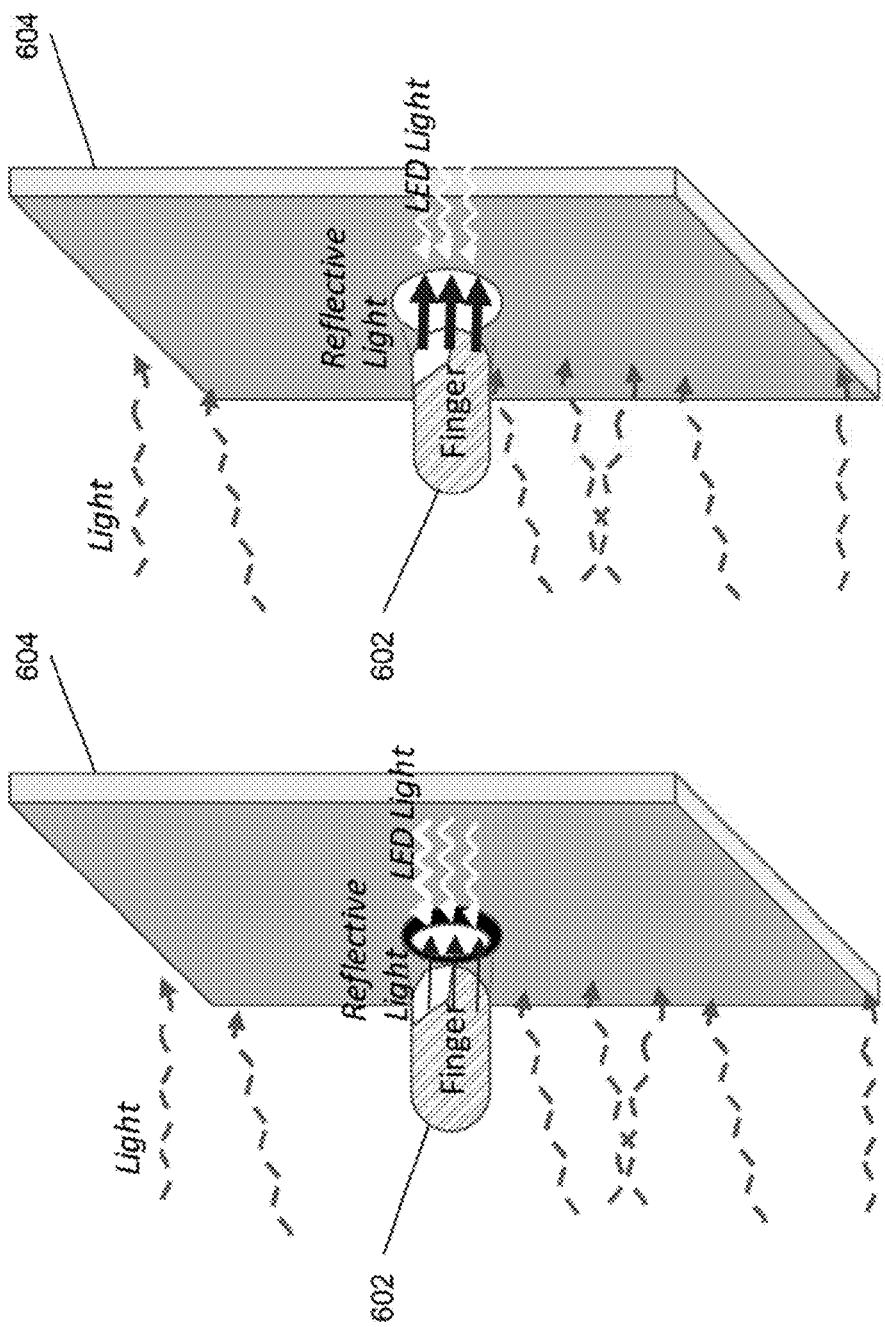

FIG. 6A illustrates a method of detecting changes of light conditions as a finger or other object 602 approaches a display 604 before making direct contact, with the display turned off; FIG. 6B illustrates a method of detecting changes of light conditions as a finger or other object 602 approaches and touches a display 604 with the display turned off according to aspects of the present disclosure. FIG. 6C illustrates a method of detecting changes of light conditions as finger or other object 602 approaches a display 604 before making direct contact; FIG. 6D illustrates a method of detecting changes of light conditions as a finger or other object 602 approaches and touches a display 604 with the display being turned on according to aspects of the present disclosure.

In the examples of FIG. 6B and FIG. 6D, when the finger or object makes contact with the panel, the area at which it makes contact may be brighter than before due to the light generated by the screen reflecting off the finger or object back onto the panel. The light sensors thus measure a higher leakage current at the area of contact.

FIGS. 7A-7C illustrate a method of sensing multiple levels of pressure as a finger or other object touches a display according to aspects of the present disclosure. In FIGS. 7A-7C, the size of the scanned image of the finger or object 702 on the panel 704 changes in correspondence to the changes of pressure of the finger or object on the screen. The pressure of the finger can be determined by the area of touch captured by a controller. FIG. 7A illustrates a simple touch, in which the controller scans a small area of the fingerprint 706. FIG. 7B illustrates a slight higher pressure relative to the simple touch applied to the screen, in which the controller scans a larger fingerprint area 708. FIG. 7C illustrates an even higher relative pressure applied to the screen, in which the controller scans an even larger fingerprint area 710.

According to aspects of the present disclosure, a controller may be configured to provide pressure sensing capabilities based on the area of touch captured. The area of touch may be compared to a predetermined reference value, which may be an absolute default value, the initial value detected upon initial contact, a value determined through calibration through input by the user, or some reference value determined through other methods. The area of touch in relation to the reference value may be used to determine the level of pressure exerted by the finger or other object on the screen. A smaller area of touch relative to the reference value can be configured to correspond to a lighter pressure, and a larger area of touch relative to the reference value can be configured to correspond to a higher pressure. Any number of different discrete levels of pressure may be designated in comparison to the reference value, or varying levels of pressure may be determined on a continuous scale.

According to aspects of the present disclosure, the multiple levels of pressure being applied to a display may be customized on an individual user basis. A user may train the controller of the multi-level command sensing device to learn the levels of light pressure touch, medium pressure touch, and high pressure touch, such as the different levels of pressure being applied and their corresponding different sizes of areas as shown in FIG. 7A, FIG. 7B, and FIG. 7C, respectively. The pressure detection functionality is also compatible with stylus pens with a soft tip, such as rubber. Pressure can be detected in a rapid tap, a pressing hold, or continuously while the finger or stylus moves across the screen.

Figures 8A, 8B, 8C:
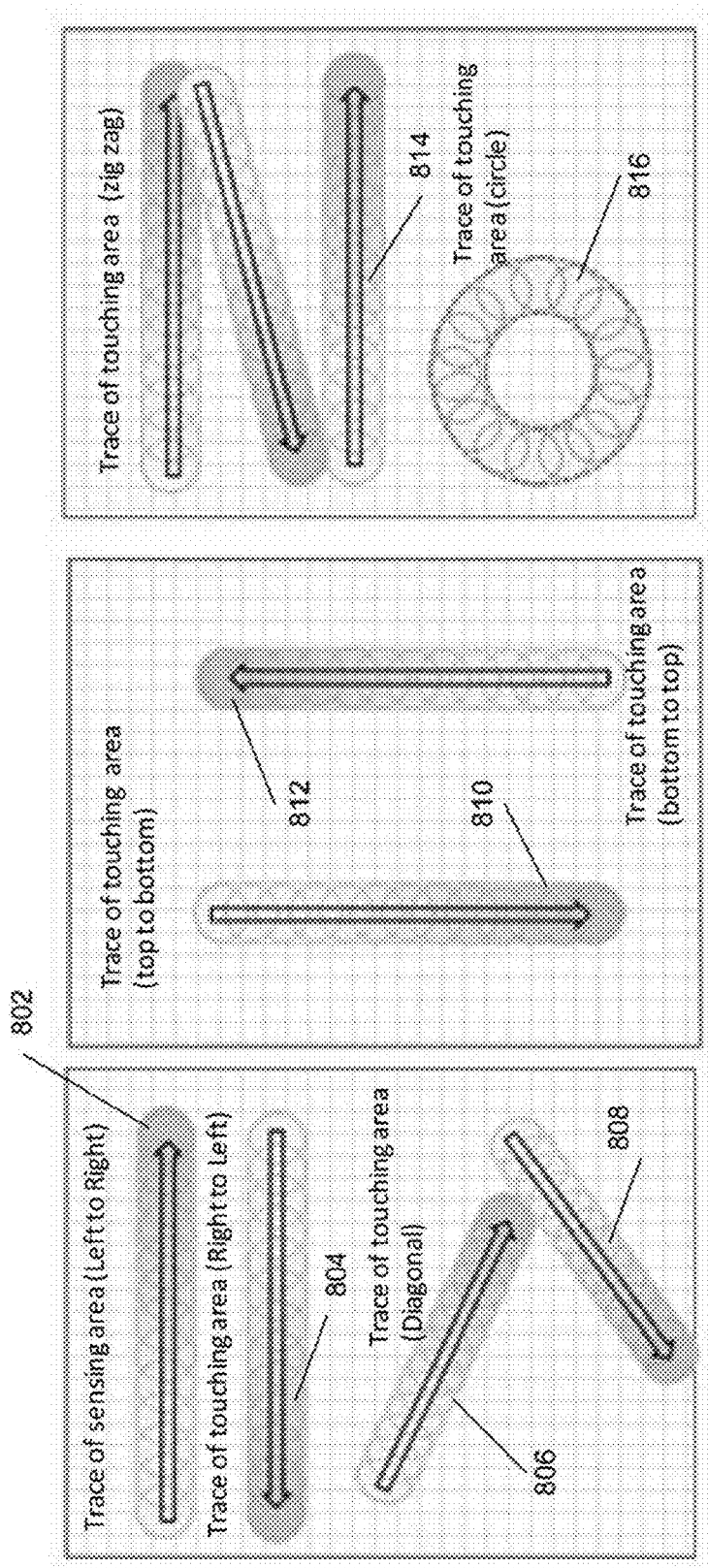
FIGS. 8A-8C illustrate other methods of determining actions performed by a user based on the changes of light conditions on the display according to aspects of the present disclosure.

FIGS. 8A-8C illustrate other methods of determining actions performed by a user based on the changes of light conditions on the display according to aspects of the present disclosure. In the examples of FIGS. 8A-8C, paths of a finger or an object (for example 802, 804, 806, 808, 810, 812, 814, or 816) can be traced by a finger on the panel. The changes in light conditions in the areas on the panel may be used to determine the location of the finger or the object.

In some implementations, with the display on, and with or without ambient light, swiping a hand across the screen (from left to right or right to left) can cause the matrix of sensors to sense a change in light being detected from one side of the screen to the other. This gesture can be programmed as commands that correspond to examining the next or previous item while browsing through some list of items. The gesture can also be programmed as commands along with a direct touch swipe to represent another level of browsing through items or data. For example, the hovering swipe gesture may flip to the next page of items, while the direct touch swipe switches to the next item on the same page.

Figure 9B:
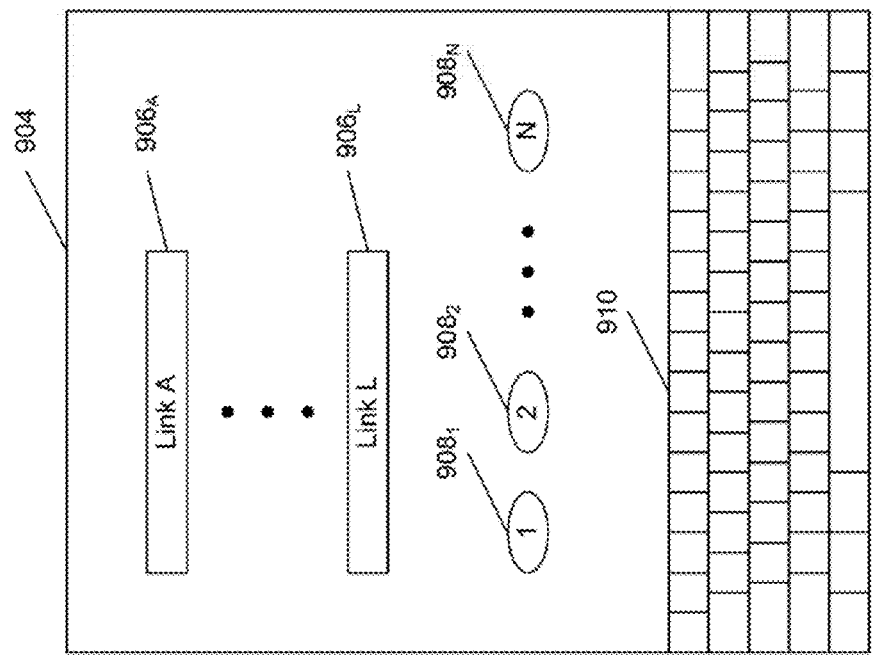
FIGS. 9A-9B illustrates examples of authenticating a user according to aspects of the present disclosure.
Figure 9A:
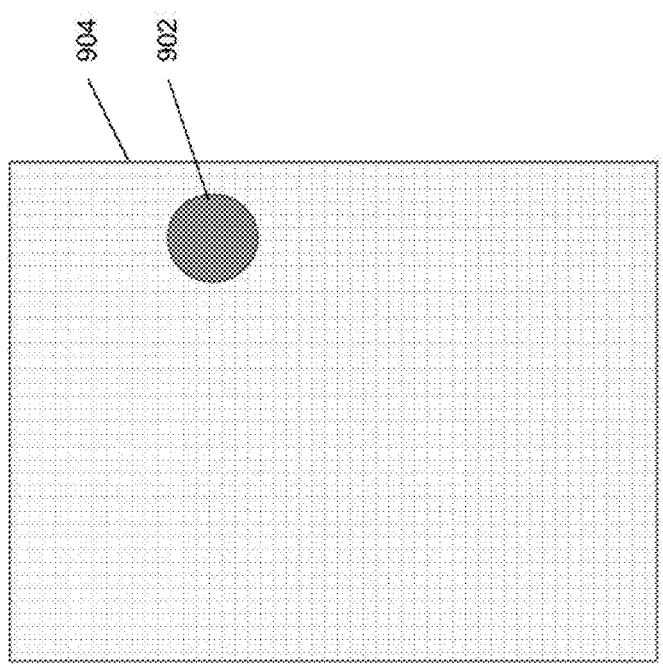
Figure 11D:
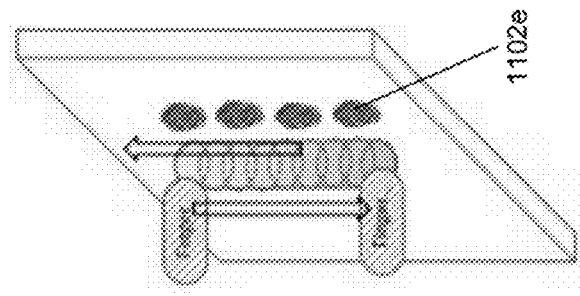
FIGS. 11A-11D illustrates yet other examples of authenticating a user according to aspects of the present disclosure.
Figure 11C:
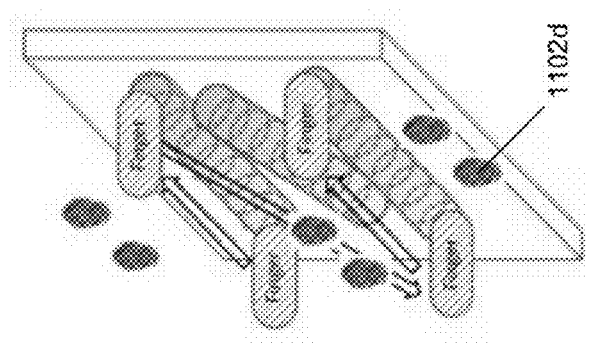
Figure 11B:
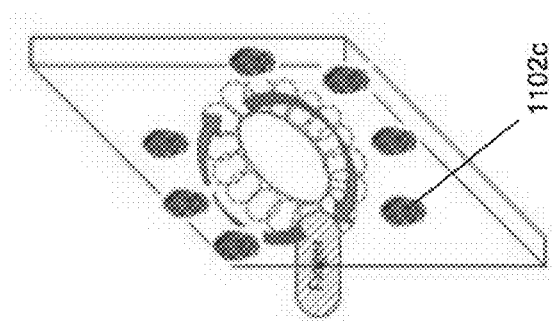
Figure 11A:
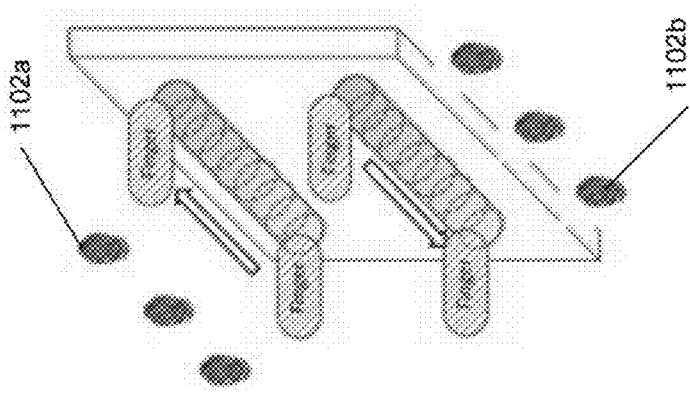

FIGS. 9A-9B illustrates examples of authenticating a user according to aspects of the present disclosure. In the example of FIG. 9A, a user may designate a specific area 902 on a display 904 for unlocking the device. A default area may also be designated. The device may only be unlocked if the finger is placed on or within the correct pre-designated area, and the validity of the fingerprint is subsequently verified.

According to aspects of the present disclosure, a controller may be configured to provide fingerprint recognition capabilities. Fingerprints may be read anywhere on the screen and in any orientation, or the functionality may be enabled at a certain region or regions of the screen. Multiple fingerprints may also be read simultaneously. The controller may also support simultaneous and/or continuous fingerprint recognition during the use of the device, in which it captures and identifies fingerprints while the finger is moving on the screen or while the user is typing.

In some implementations, a combination of methods for unlocking the device may be used and intuitively integrated—for example, after waking up the display, a pattern may be drawn, and the finger may remain on the screen without lifting for a short period of time after drawing the pattern, so that the device may verify the validity of the fingerprint. This can provide an additional layer of security for the device, requiring both a correct pattern and a valid fingerprint. This method of double verification can be seamlessly executed with a panel that serves both as a display and a fingerprint sensor, as it does not require two separate actions—one of drawing the pattern on the screen, and one of scanning the fingerprint on a separate fingerprint sensor—on the part of the user.

Since the fingerprint recognition technology is integrated into the entire screen and not limited to a certain area or areas on the device, a fingerprint may be read for verification to unlock the device anywhere on the display screen, in any position or orientation. In some implementations, a certain area may be specifically designated for fingerprint capture for unlocking the device by the user. Additionally, in some other implementations, multiple fingerprints or a palm print can be read and identified simultaneously by the controller and be required to unlock the device, providing additional security.

In the example of FIG. 9B, the apparatus may be configured to continuously authenticate the user during an access to security sensitive information. In one exemplary implementation, the apparatus may be configured to authenticate the user when the user touches one or more links on a display 904, such as Link A $906_A$ to Link L $906_L$, or when the user presses one or more buttons, such as button $908_1$ to button $908_N$, or when the user types using a displayed keyboard 910. Upon detecting one or more mismatches found in the continuously authenticating process, the apparatus may terminate the access to the security sensitive information.

According to aspects of the present disclosure, the controller can provide an additional layer of security for sensitive mobile applications after the phone itself has been unlocked by requiring that the fingerprint be read and verified in the moment that the icon for a particular mobile application is selected. The fingerprint may be directly scanned on the screen in the moment of or after making a selection without having to be lifted and placed on another area on the device. Access may be granted if the fingerprint is consistent with that of the owner of the device or otherwise determined to be valid. In addition, the device may recognize fingerprints on the screen directly during active operation of device for sensitive data or material, such as a bank account. The device may be configured to lock if a foreign fingerprint or fingerprints are detected during the operation. An exact number or threshold may be specified.

FIGS. 10A-10D illustrates other examples of authenticating a user according to aspects of the present disclosure. In the examples of FIGS. 10A-10D, the verification of a fingerprint may be performed after first drawing a pattern to unlock the device. After waking the display, a pattern is drawn (for example, 1004, 1006, 1008, 1010 or 1012), and the finger remains on the screen without lifting for a short period of time, allowing the device to verify the validity of the fingerprint (for example, 1014a, 1014b, 1014c, 1014d, 1014e, or 1014f). The device may be configured to unlock only after both the correct pattern is drawn and the validity of the fingerprint is verified.

FIGS. 11A-11D illustrate other examples of authenticating a user according to aspects of the present disclosure. In the examples of FIGS. 11A-11D, fingerprint recognition may be performed during active use of the touchscreen. The controller can be configured to capture fingerprints, such as 1102a, 1102b, 1102c, 1102d, or 1102e, on the screen during active operation of the device for sensitive information, such as a bank account. The device may be configured to lock if an unauthenticated fingerprint or fingerprints are detected. An exact number or threshold may be specified.

Figure 12:
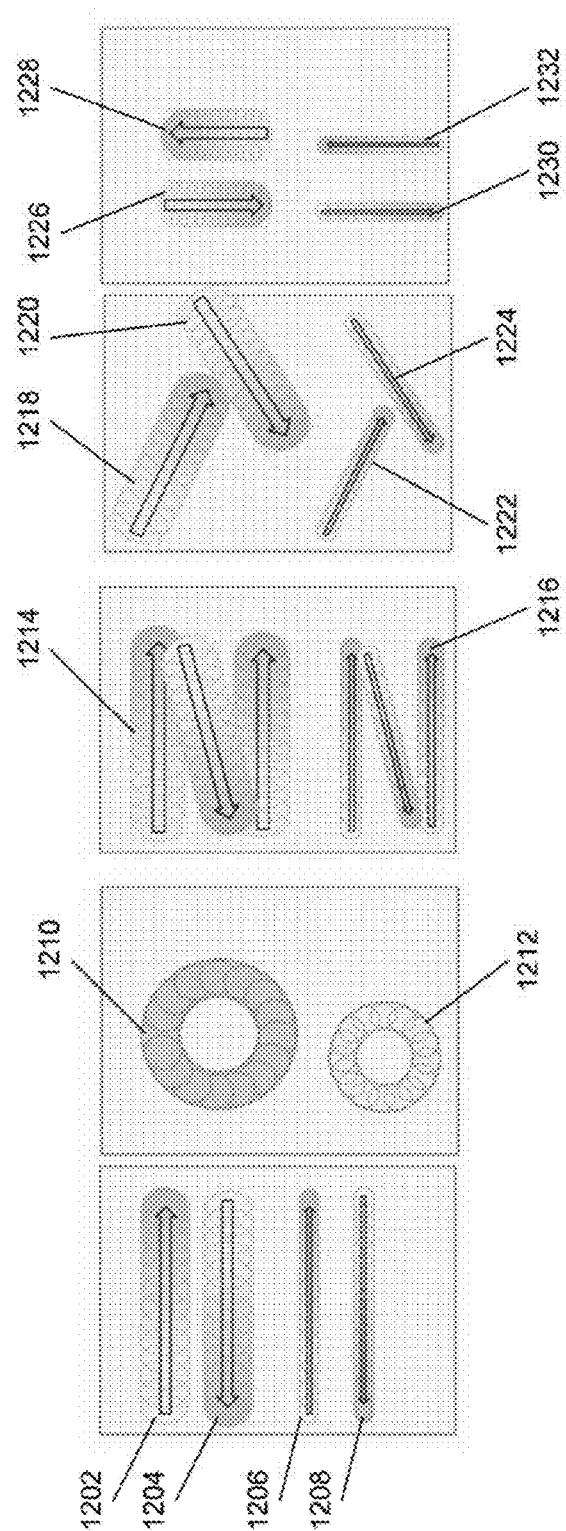
FIG. 12 illustrates methods of defining different levels of pressure touches by a user according to aspects of the present disclosure.

FIG. 12 illustrates examples of various pressure-based touch commands according to aspects of the present disclosure. Different commands, such as 1202 to 1232, may be designated based on different levels of pressures of touches in addition to different types of gestures/motions on the screen. In some embodiments, the different commands corresponding to different levels of pressure being applied to a display may be customized by a user of the multi-level command sensing device. The user may train the controller of the multi-level command sensing device to learn the different individualized pressures of touches, such as the different areas of up, down, left, right, diagonal, circular, zigzag motions, etc. as shown by numerals 1202 to 1232 in FIG. 12.

Figure 13:
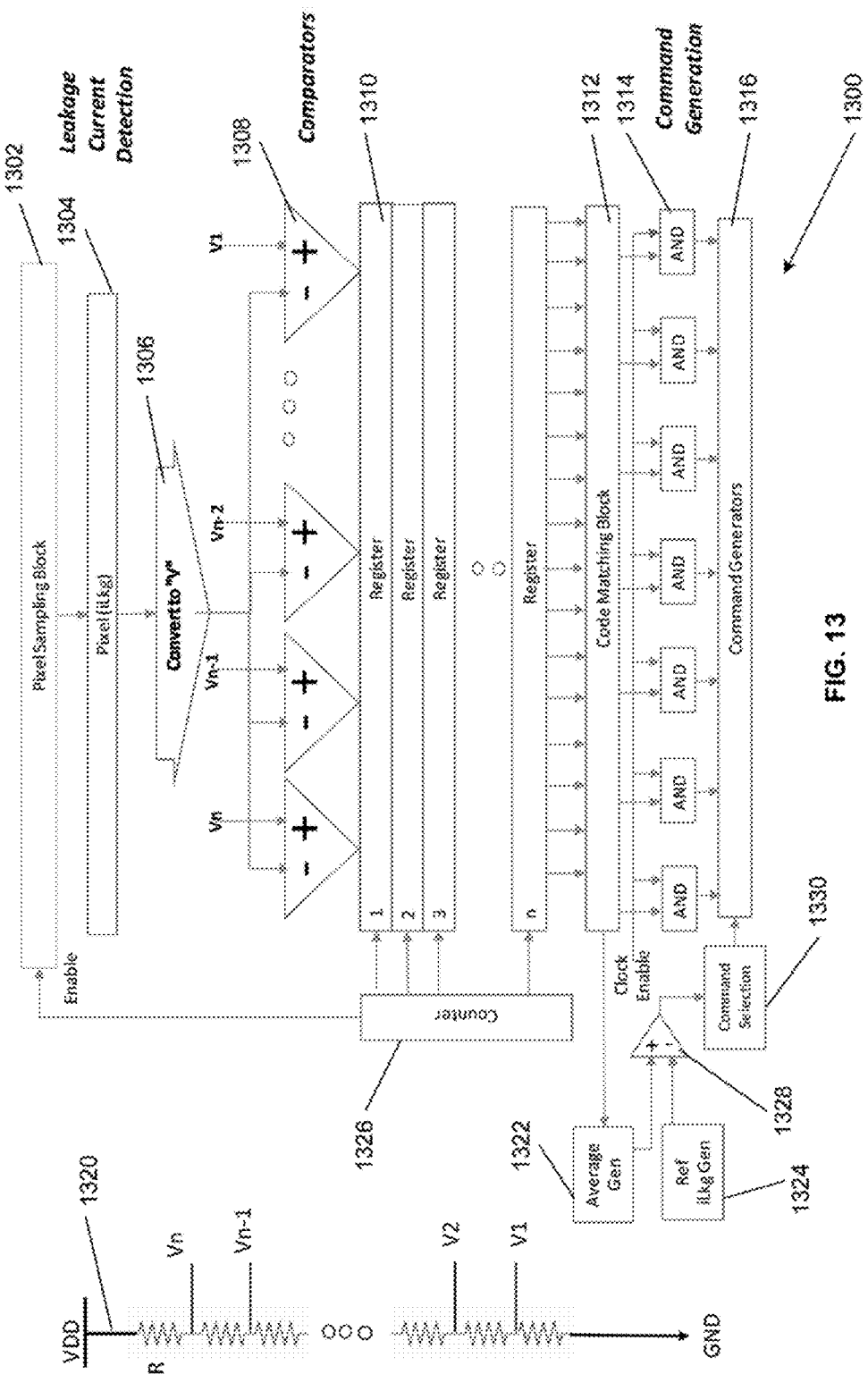
FIG. 13 illustrates an exemplary circuit for detecting a leakage current corresponding to changes of light conditions on a display according to aspects of the present disclosure.

FIG. 13 illustrates an exemplary circuit for detecting a leakage current corresponding to changes in light conditions on a display according to aspects of the present disclosure. In FIG. 13, an exemplary control circuit for determining whether an object or finger is hovering or touching the panel and its corresponding position is shown. The exemplary control circuit 1300 comprises a leakage current detection phase, a comparison phase, and a command generation phase. In one particular implementation, the exemplary control circuit 1300 includes one or more pixel sampling blocks 1302, one or more pixel leakage current detectors 1304, one or more current converters 1306, a plurality of comparators 1308, a plurality of registers 1310, one or more code matching blocks 1312, a plurality of AND blocks 1314, and one or more command generators 1316. The exemplary control circuit 1300 further includes a register divider generator 1320, an average generator 1322, a reference leakage current generator 1324, a counter 1326, a generator comparator 1328, and a command selection block 1330. The above components are communicatively coupled as shown in FIG. 13 to form the exemplary control circuit 1300.

According to aspects of the present disclosure, the control circuit can be configured to compare the leakage currents of each position in the matrix of sensors to a reference. Based on reference leakage currents that come from experimental data, the controller can determine the difference between hovering and touching modes on the screen. Reference leakage voltage for hovering can be smaller than the minimum leakage voltage of touching mode. Each comparator detects the pixels' leakage currents, which is converted to voltage and compared to a resistor divider voltage generator. It generates a command which represents the action on the screen. In some implementations, a set of user defined commands may be generated and stored in a database or memory of the multi-level command sensing apparatus. If output data from comparators match one of the existing commands in the memory, it selects the corresponding action from the controller through the command generator. The output of command generator selects one of the expected actions. In one exemplary implementation, the processing can be synchronized using a synchronization clock.

FIGS. 14A-14C illustrate examples of OLEDs with light sensors for detecting a leakage current corresponding to changes of light conditions according to aspects of the present disclosure. FIG. 14A illustrates a unidirectional OLED 1402 with light sensors; FIG. 14B illustrates a conformable OLED 1404 with light sensors; and FIG. 14C illustrates a bi-directional OLED 1406 with light sensors according to aspects of the present disclosure.

According to aspects of the present disclosure, both top emission and bottom emission type OLED structures can be used as the main component of a fingerprint acquisition apparatus. Several different types of OLED devices, such as small molecule OLED, polymer OLED, or solution based OLED, may be utilized as main OLED device structures. Both transparent and non-transparent OLED panels can be used as the main component of a fingerprint acquisition apparatus. Both thin panel and flexible or conformable types of OLED panels can be used as the main component of a fingerprint acquisition apparatus.

An active matrix OLED (AMOLED) panel can be used as the main component of a fingerprint acquisition apparatus. An AMOLED panel may include subpixel areas (red, green, and blue subpixels) and a driving circuit area (thin film transistor and capacitor). The brightness of each subpixel can be adjusted by the driving and switching transistors and capacitors and by controlling the amount of current injected to the OLED subpixels. The dimension of subpixels can be formed using OLED material deposition techniques. For instance, the size and position of subpixels can be set by using shadow masks during the OLED material evaporation process.

An OLED may have a layered structure with the following sequence: anode/hole injection layer/hole transport layer/emissive layer/electron transport layer/electron injection layer/cathode. ITO and other transparent conducting materials having high work function can be used for anode materials, and metals such as aluminum and magnesium can be used for cathode materials. In some implementations, the imaging surface would be at the bottom of the substrate, and the light emission plane would be the cathode layer. The optical structure may include the transparent layers between the substrate and the cathode.

Figures 15A, 15B:
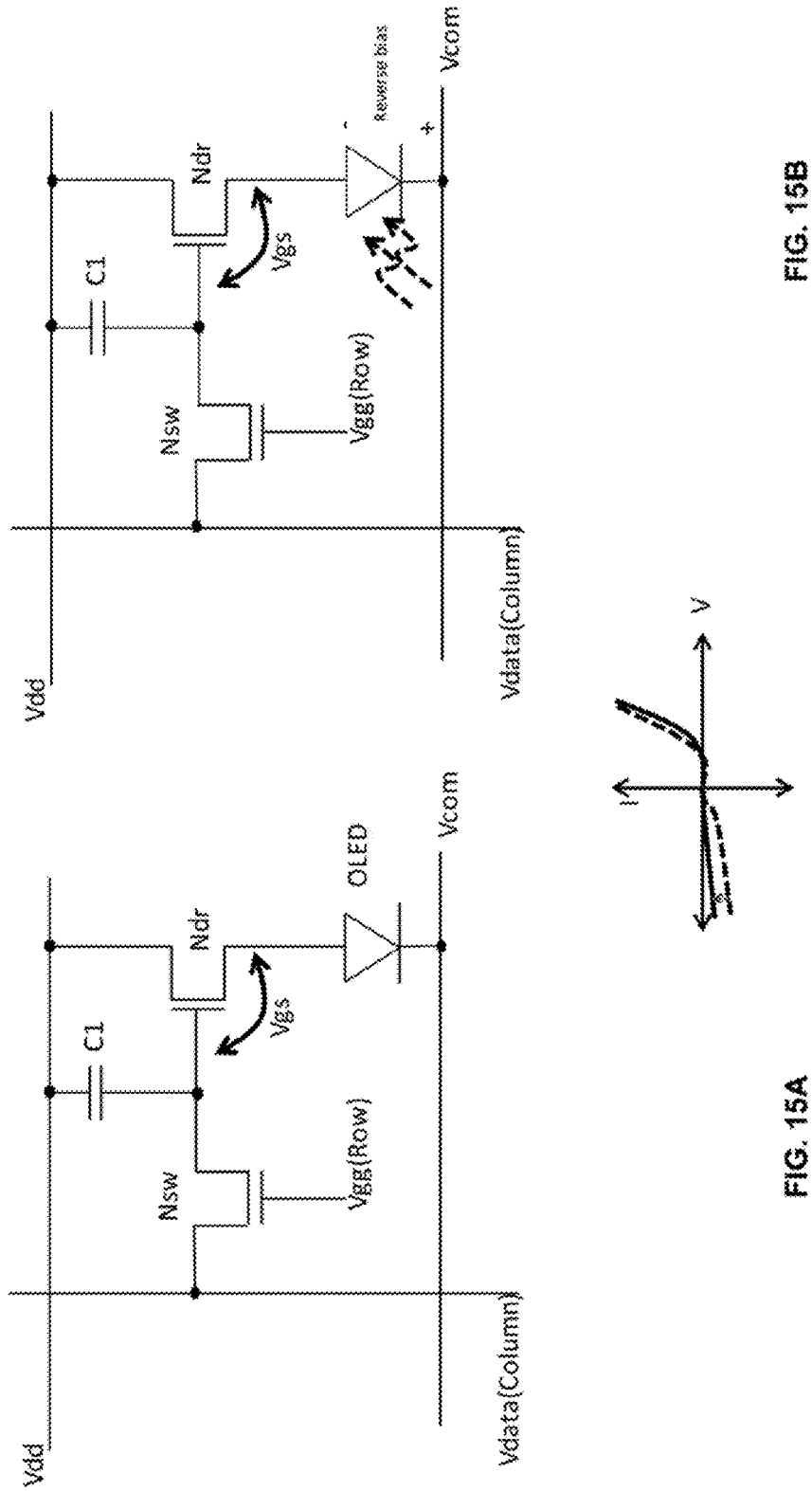
FIG. 15A illustrates an exemplary subpixel circuit cell with forward bias according to aspects of the present disclosure.
FIG. 15B illustrates an exemplary subpixel circuit cell with reverse bias according to aspects of the present disclosure.

FIG. 15A illustrates an exemplary subpixel circuit cell with forward bias according to aspects of the present disclosure; FIG. 15B illustrates an exemplary subpixel circuit cell with reverse bias according to aspects of the present disclosure.

The reliability of such a fingerprint acquisition apparatus, i.e. the OLED panel lifetime, can be improved by using various sealing techniques and materials, such as desiccant, frit glass sealing, and thin film encapsulation. Various types of substrates such as sapphire, glass, and plastic materials can be used for OLED carriers in order to control the light travel path (refractive index control), to enhance/improve signal to noise ratio of image sensing, and to improve the reliability and lifetime of fingerprint apparatus. FIG. 15A shows an exemplary AMOLED subpixel unit cell circuit (2D-driving TFT circuit with subpixels). The driving area may include a driving transistor, switching transistor, holding capacitor, and reverse current sensor. FIG. 15B shows the reverse current read and amplified in the OLED circuit structure.

Figure 16:
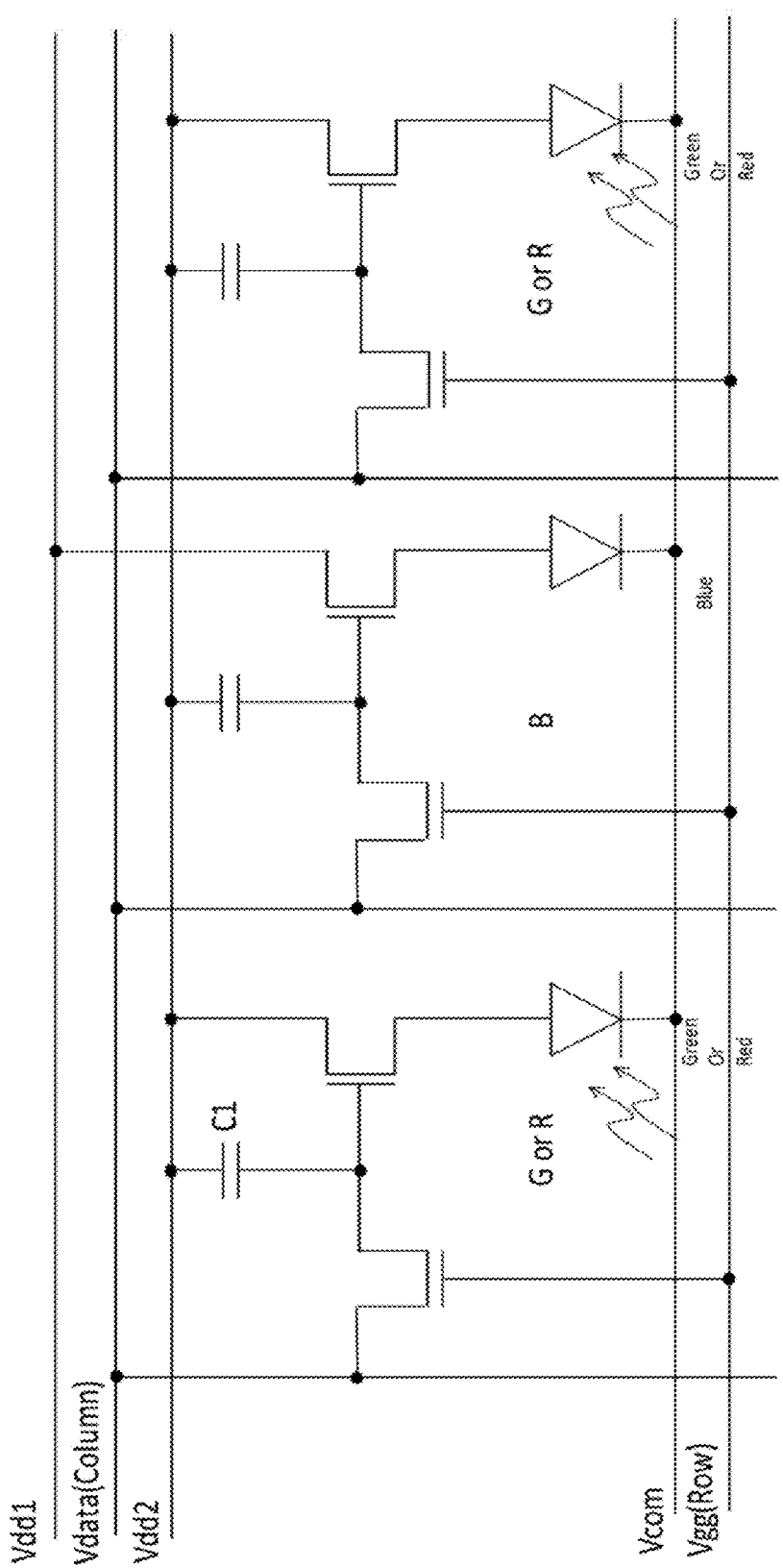
FIG. 16 illustrates an exemplary pixel circuit cell with RGB subpixels according to aspects of the present disclosure.

FIG. 16 illustrates an exemplary pixel circuit cell with RGB subpixels according to aspects of the present disclosure. In some embodiments, an AMOLED panel has a three-subpixel structure. In the subpixel structure, for example, a blue subpixel can be used as a light source while the neighboring green or red subpixels may be used as a sensor because the band gap of blue subpixels is larger than that of the green or red subpixels. FIG. 16 shows an exemplary R/G/B pixel structure where the blue subpixel is the light source, and the green or red subpixel is the sensor. The reverse voltage can be biased in the sensor subpixel when the lighting subpixel is turned on. In FIG. 15B, the I-V curves correspond with subpixel structures in FIG. 16. The amount of reverse current in the sensor subpixel under reverse bias is increased when light is reflected, refracted, or scattered from a fingerprint to the sensor subpixel. The amount of reverse current can be measured using current sensing circuits in the driving circuit area. The reverse current signal can be amplified using an amplification circuit, and/or a signal processor. The amplified current signal can then be processed to generate a fingerprint image by a signal processing algorithm.

The OLED panel resolution can be controlled by varying the size and density of each subpixel and by setting the subpixel structure of the OLED panel. For example, an OLED panel may have a larger lighting component (e.g. blue subpixels) and a smaller sensor component (e.g. green and/or red subpixels). According to aspects of the present disclosure, subpixel structures can have different sizes. The subpixel density can be enhanced by changing pixel shape from stripe type to circular or diamond shape. In addition, an OLED subpixel structure can have different shapes, such as square, rectangle, circle, diamond, etc. The patterning of the subpixel structure can be fabricated by using fine metal mask processes, ink-jet printing, or laser transfer technologies.

Figure 17:
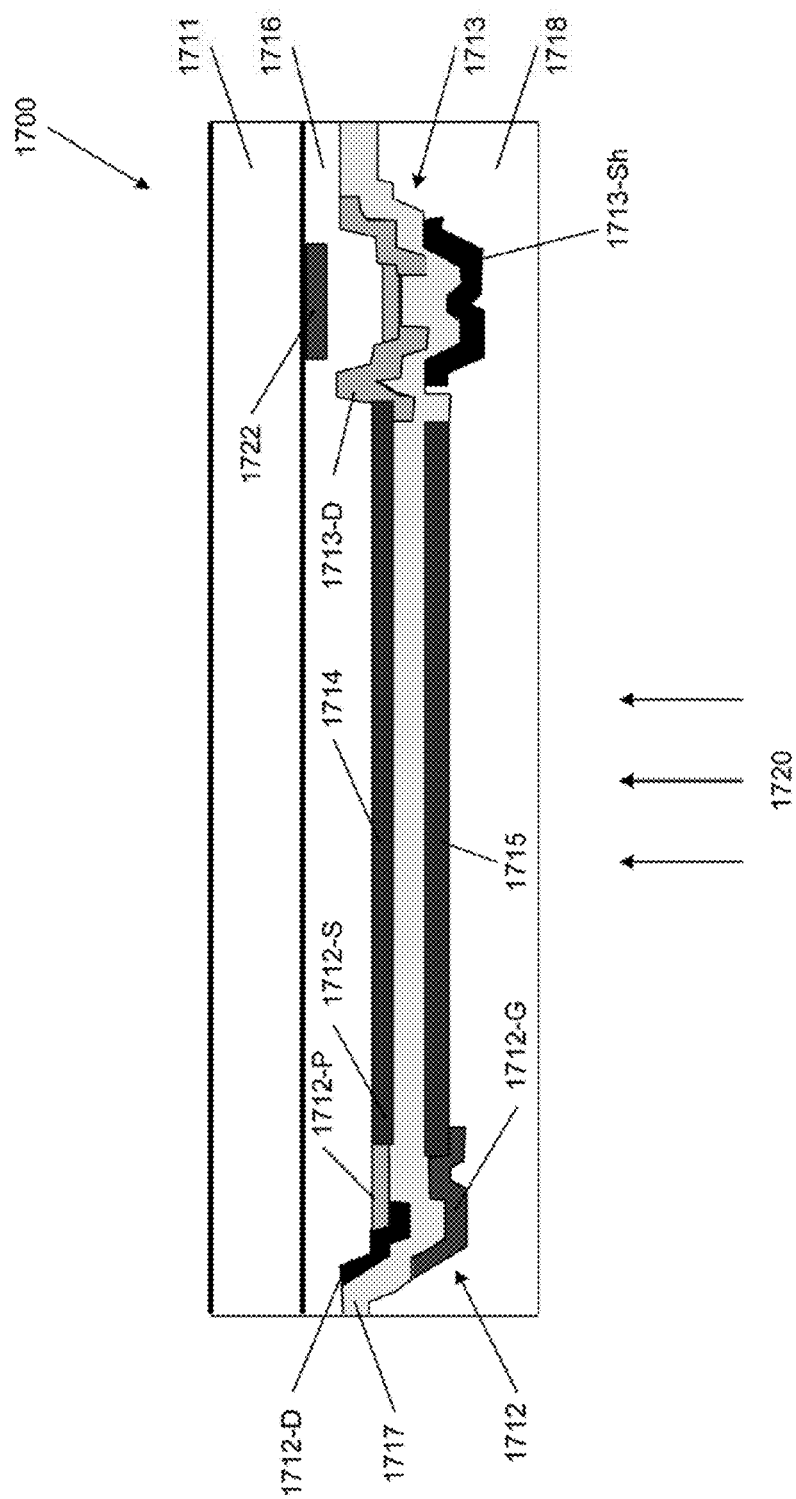
FIG. 17 illustrates an exemplary light sensing panel using a thin film transistor (TFT) panel structure according to aspects of the present disclosure.

FIG. 17 illustrates an exemplary light sensing panel using a thin film transistor (TFT) panel structure according to aspects of the present disclosure. Each cell of the TFT panel structure can be an addressable light sensing component, referred to as a sensing pixel. In the example shown in FIG. 17, capture sensor 1700 includes a passivation layer 1718, which can be formed of SiNx. On top of passivation layer 1718, a storage capacitor layer is formed including first electrode 1715. This storage capacitor layer is preferably formed from indium tin oxide (ITO), which is conductive and transparent. On top of first electrode 1715, an insulating layer 1717 is formed, preferably of SiNx. Over insulating layer 1717, a second electrode 1714 is formed, preferably of tin oxide. First electrode 1715, insulating layer 1717 and second electrode 1714 together form the storage capacitor. Over second electrode 1714, another insulating layer 1716 is formed, which can be formed from SiNx. A layer of glass layer 1711 is placed over insulating layer 1716. A fingerprint to be imaged is placed on glass layer 1711, which may be referred to herein as the imaging surface.

A light sensing unit 1712 (also referred to as a light sensor), which is preferably a thin-film transistor, and a switching unit 1713, which is also preferably a thin-film transistor, are horizontally arranged on a passivation layer 1718. Under passivation layer 1718, a back light 1720 irradiates light upward to be passed through the fingerprint capture sensor 1700. As shown in FIG. 17, back light 1720 can be separated from a lower, exposed surface of passivation layer 1718. It is also considered, however, that backlight 1720 be placed against lower surface of passivation layer 1718. Backlight 1720 can be an LED or any other type of light source. A source electrode 1712-S of the light sensing unit 1712 and a drain electrode 1713-D of the switching unit 1713 are electrically connected through second electrode 1714. A gate electrode 1712-G of the light sensing unit 1712 is connected to first electrode 1715. Additionally, a first light shielding layer 1713-*sh* is placed between insulating layer 1717 and passivation layer 1718 at switching unit 1713. As detailed below, first light shielding layer 1713-*sh* blocks light from backlight 1720 from reaching switching unit 1713. Additionally, second light shielding layer 1722 is positioned between glass layer 1711 and insulating layer 1716 at switching unit 1713 to shield switching unit 1713 from light passing through or reflected from glass layer 1711.

In the above structure, a photosensitive layer 1712-P such as amorphous silicon (a-Si:H) is formed between the drain electrode 1712-D and source electrode 1712-S of the light sensing unit 1712. Note that photosensitive layer 1712-P allows current to flow in response to a predetermined amount of light striking a surface of photosensitive layer 1712-P. In this way, when more than a predetermined quantity of light is received at a surface of photosensitive layer 1712-P, current flows through the drain electrode 1712-D and the source electrode 1712-S.

According to aspects of the present disclosure, in a method of fabricating capture sensor 1700, a second light shielding layer 1722 is first placed on glass layer 1711 via evaporation, sputtering or any other method. Glass layer 1711 is preferably between about 5 and 10 um, though may be either thicker or thinner. Light shielding layer 1722 is preferably formed from a metal such as aluminum, but may be formed from any suitable light blocking material. Next, insulating layer 1716 is formed on top of glass layer 1711 and second light shielding layer 1722. As noted above, insulating layer 1716 is preferably formed from SiNx. Photosensitive layer 1712-P is then formed over insulating layer 1716. As discussed above, photosensitive layer 1712-P is preferably formed from a-Si:H. Source electrode 1712-D of light sensing unit 1712, second electrode 1714 and drain electrode 1713-D of switching unit 1713 are next formed over insulating layer 1716. Source electrode 1712-D, second electrode 1714 and drain electrode 1713-D are each preferably formed of ITO, but may be formed of any suitable conductor. Next, insulating layer 1717 is formed and over insulating layer 1717 first electrode 1715 is formed. Insulating layer 1717 is preferably formed from SiNx and first electrode 1715 is preferably formed of ITO but may be formed of any suitable conductor. Next, gate electrode 1712-G of light sensing unit 1712 and light shield 1713-*sh* are formed. Preferably, gate electrode 1712-G and light shielding layer 1713-*sh* are each formed of ITO, but may be formed of any suitable material and light shielding layer 1713-*sh* does not need to be formed from the same material as gate electrode 1712-G. Next, passivation layer 1718, which is preferably formed from SiNx, is formed over first electrode 1715, gate electrode 1712-G and light shielding layer 1713-*sh*. As discussed above, backlight 1720 can either be attached to the lower, exposed surface of passivation layer 1718 or separately supported.

In another implementation, an image capture sensor can have substantially the same structure as capture sensor shown in FIG. 17 except that conductive ITO layer is placed beneath glass layer and an insulating layer, which can be formed of SiNx, is placed below ITO layer. Because ITO layer is conductive, electrostatic charge built up on glass layer can be discharged by connecting ITO layer to a ground. This can prevent damage to capture sensor. Image capture sensor can be fabricated in substantially the same manner as image capture sensor except that ITO layer is formed over glass layer and insulating layer is formed over ITO layer prior to forming light shielding layer over insulating layer.

In yet another implementation, an image capture sensor can have substantially the same structure as capture sensor shown in FIG. 17. Specifically, the capture sensor includes a light sensing unit, which is substantially the same and light sensing unit, and switching unit, which is substantially the same as switching unit, formed between an insulating layer and a passivation layer. However, above insulating layer capture sensor includes a substrate layer having a plurality of fiber-optic strands running in a direction perpendicular to a surface of substrate layer. Preferably, the diameter of the fiber-optic strands 330*a* forming substrate layer is from about 4 um to about 8 um in diameter and more preferably about 6 um in diameters, though larger or smaller diameters can also be used. Substrate layer can be formed from glass fiber optic strands 330*a* or fiber optic strands of other substantially transparent materials including polymers. Fiber optic sheets can be used to form the substrate layer.

Figure 18:
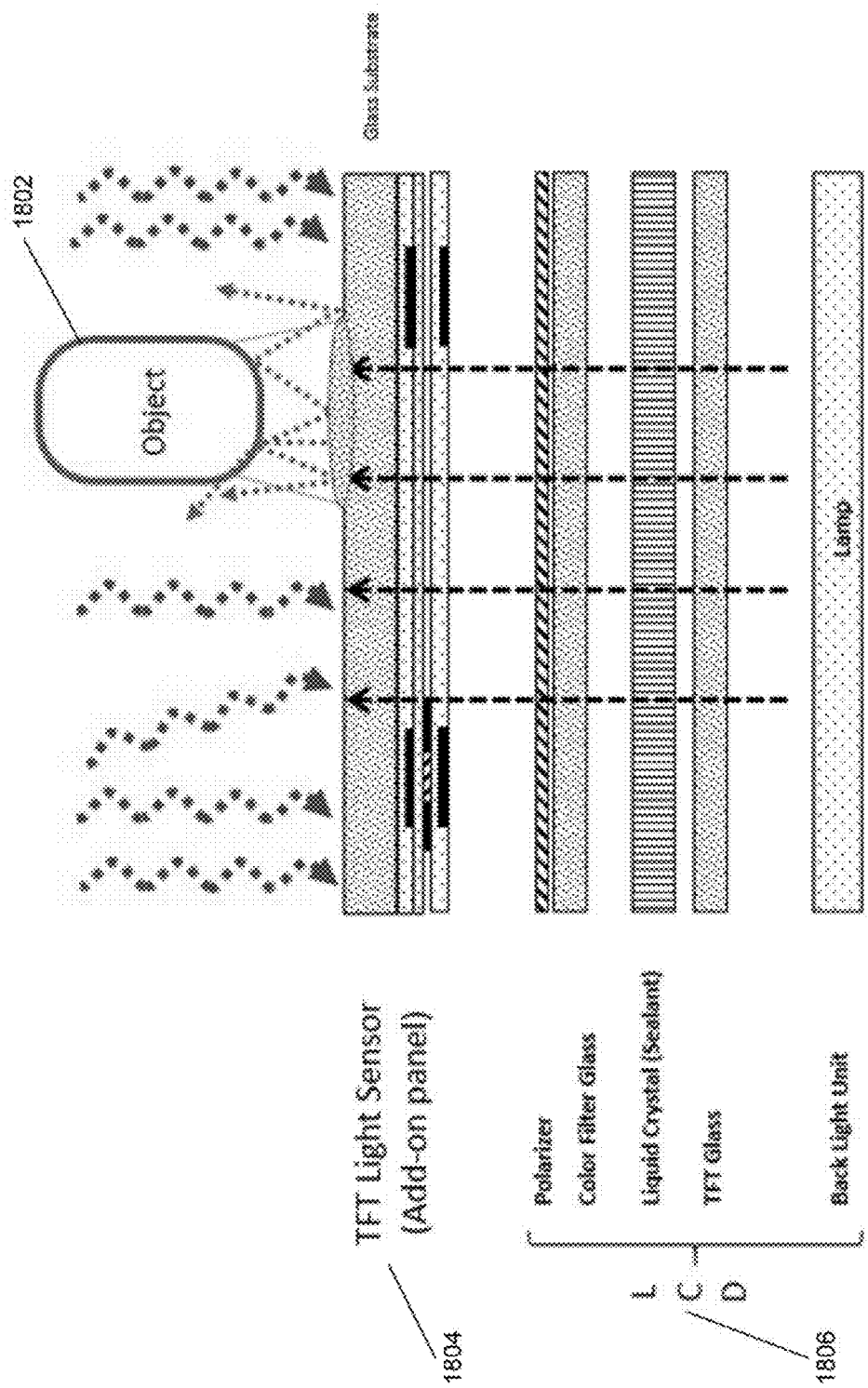
FIG. 18 illustrates an exemplary display with light sensors for detecting changes of light conditions caused by an object hovering above the display according to aspects of the present disclosure.
Figure 19:
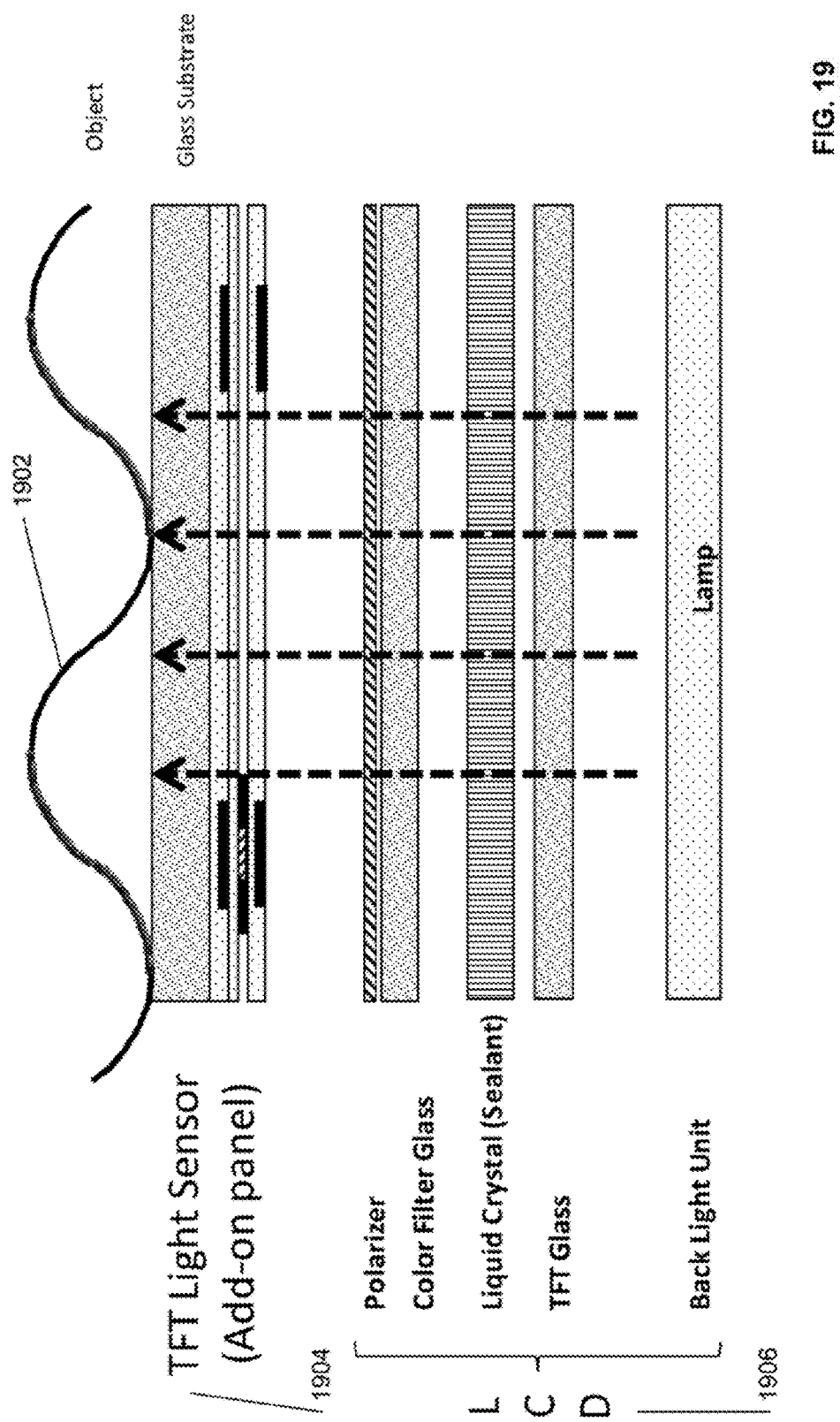
FIG. 19 illustrates an exemplary display with light sensors for detecting changes of light conditions caused by an object touching the display according to aspects of the present disclosure.

FIG. 18 illustrates an exemplary display with light sensors for detecting changes of light conditions caused by an object 1802 hovering above the display according to aspects of the present disclosure. FIG. 19 illustrates an exemplary display with light sensors for detecting changes of light conditions caused by an object 1902 touching the display according to aspects of the present disclosure.

A light sensor panel can be implemented as an add-on panel that is placed on top of a light source panel. The light source panel can be, for example, an LCD panel or an AMOLED panel. FIG. 18 illustrates a TFT type light sensor panel 1804 is placed on top of an LCD display panel structure 1806 as an add-on panel. Similarly, FIG. 19 illustrates a TFT type light sensor panel 1904 is placed on top of an LCD display panel structure 1906 as an add-on panel. In the examples of FIG. 18 and FIG. 19, a TFT type light sensor panel is placed on top of an LCD panel structure as an add-on panel. The sensing pixels of the TFT type light sensing panel can be individually addressable and can be activated according to a designated sensor zone pattern.

If there are non-transparent areas in the light sensor panel, these areas can be aligned with the non-transparent areas of the light source panel. As an example, TFT light sensor panel may be aligned with an LCD panel structure, wherein non-transparent components of the TFT light sensor panel are aligned with the black matrix areas of the LCD display panel structure. In this approach, the TFT light sensor panel is aligned with the LCD panel structure. The non-transparent components on the TFT light sensor panel are aligned with the black matrix area on the LCD display panel structure.

The black matrix areas of the LCD display panel are non-transparent and therefore would block the transmission of the display backlight. The light sensor panel can be designed so that its non-transparent areas can be aligned with the black matrix areas of the LCD panel. When the LCD display emits light through the transparent areas of the LCD display, this light can be used as the light source for the light sensor panel. The LCD display can individually control cells (individually addressable) to emit light as discrete light sources that are projected into the light refractor according to a designated illumination pattern.

As described above, the light refracting device can, for example, also be a thin-film transistor (TFT) add-on panel placed on top of an LCD or AMOLED display panel structure that acts as a panel of light sources. Incident light from the light source panel is projected through the light receiving surface and projected directly or indirectly onto the imaging surface to create an image of the patterned object from the projected light onto the viewing plane. This multi-level command sensing apparatus can be also used as a touch sensor when implemented in a mobile device.

Figure 20:
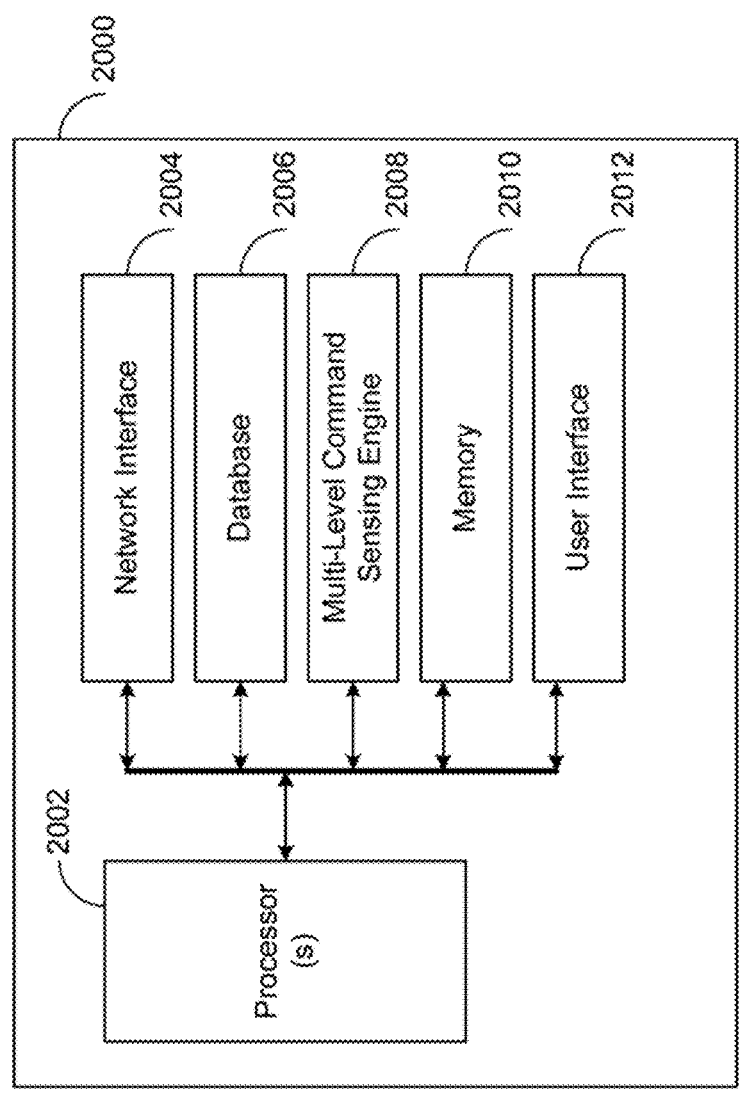
FIG. 20 illustrates an exemplary controller of a multi-level command sensing apparatus according to aspects of the present disclosure.

FIG. 20 illustrates an exemplary controller of a multi-level command sensing apparatus according to aspects of the present disclosure. As shown in FIG. 20, a controller 2000 of the multi-level command sensing apparatus may include one or more processors 2002, a network interface 2004, a database 2006, a multi-level command sensing engine, 2008, a memory 2010, and a user interface 2012. In some implementations, the multi-level command sensing apparatus may be a part of a mobile device.

According to aspects of the present disclosure, a mobile device is usually equipped with a touch sensor. If a mobile device was equipped with the multi-level command sensing apparatus of the present disclosure, then the touch sensor would not be required, as the multi-level command sensing apparatus may also be used as a touch sensor. As described herein, a mobile device can be configured to include a multi-level command sensing apparatus for fingerprint recognition. In some implementations, the mobile device may comprise a wireless transceiver which is capable of transmitting and receiving wireless signals via wireless antenna over a wireless communication network. Wireless transceiver may be connected to a bus by a wireless transceiver bus interface. The wireless transceiver bus interface may, in some embodiments be at least partially integrated with wireless transceiver. Some embodiments may include multiple wireless transceivers and wireless antennas to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

The mobile device may also comprise a SPS receiver capable of receiving and acquiring SPS signals via a SPS antenna. The SPS receiver may also process, in whole or in part, acquired SPS signals for estimating a location of the mobile device. In some embodiments, processor(s), memory, DSP(s) and/or specialized processors (not shown) may also be utilized to process acquired SPS signals, in whole or in part, and/or calculate an estimated location of the mobile device, in conjunction with the SPS receiver. Storage of SPS or other signals for use in performing positioning operations may be performed in memory or registers (not shown).

In addition, the mobile device may comprise digital signal processor(s) (DSP(s)) connected to the bus by a bus interface, processor(s) connected to the bus by a bus interface and memory. The bus interface may be integrated with the DSP(s), processor(s) and memory. In various embodiments, functions may be performed in response execution of one or more machine-readable instructions stored in memory such as on a computer-readable storage medium, such as RAM, ROM, FLASH, or disc drive, just to name a few example. The one or more instructions may be executable by processor(s), specialized processors, or DSP(s). The memory may comprise a non-transitory processor-readable memory and/or a computer-readable memory that stores software code (programming code, instructions, etc.) that are executable by processor(s) and/or DSP(s) to perform functions described herein. In a particular implementation, the wireless transceiver may communicate with processor(s) and/or DSP(s) through the bus to enable the mobile device to be configured as a wireless station as discussed above. Processor(s) and/or DSP(s) may execute instructions to execute one or more aspects of processes/methods discussed above in connection with FIGS. 21A-21D.

According to aspects of the present disclosure, a user interface may comprise any one of several devices such as, for example, a speaker, microphone, display device, vibration device, keyboard, touch screen, etc. In a particular implementation, the user interface may enable a user to interact with one or more applications hosted on the mobile device. For example, devices of user interface may store analog or digital signals on the memory to be further processed by DSP(s) or processor in response to action from a user. Similarly, applications hosted on the mobile device may store analog or digital signals on the memory to present an output signal to a user. In another implementation, the mobile device may optionally include a dedicated audio input/output (I/O) device comprising, for example, a dedicated speaker, microphone, digital to analog circuitry, analog to digital circuitry, amplifiers and/or gain control. In another implementation, the mobile device may comprise touch sensors responsive to touching or pressure on a keyboard or touch screen device.

The mobile device may also comprise a dedicated camera device for capturing still or moving imagery. The dedicated camera device may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at the processor(s) or DSP(s). Alternatively, a dedicated video processor may perform conditioning, encoding, compression or manipulation of signals representing captured images. Additionally, the dedicated video processor may decode/decompress stored image data for presentation on a display device on the mobile device.

The mobile device may also comprise sensors coupled to the bus which may include, for example, inertial sensors and environment sensors. Inertial sensors may comprise, for example accelerometers (e.g., collectively responding to acceleration of the mobile device in three dimensions), one or more gyroscopes or one or more magnetometers (e.g., to support one or more compass applications). Environment sensors of the mobile device may comprise, for example, temperature sensors, barometric pressure sensors, ambient light sensors, and camera imagers, microphones, just to name few examples. The sensors may generate analog or digital signals that may be stored in memory and processed by DPS(s) or processor(s) in support of one or more applications such as, for example, applications directed to positioning or navigation operations.

In a particular implementation, the mobile device may comprise a dedicated modem processor capable of performing baseband processing of signals received and down-converted at a wireless transceiver or SPS receiver. Similarly, the dedicated modem processor may perform baseband processing of signals to be up-converted for transmission by the wireless transceiver. In alternative implementations, instead of having a dedicated modem processor, baseband processing may be performed by a processor or DSP (e.g., processor(s) or DSP(s)).

FIG. 21A illustrates method of performing multi-level command sensing according to aspects of the present disclosure. In the example shown in FIG. 21A, in block 2102, the method detects a leakage current corresponding to changes of light conditions on a display by one or more light sensors of a multi-level command sensing apparatus. In block 2104, the method determines an action performed by a user based on the changes of light conditions on the display by a controller of the multi-level command sensing apparatus. In block 2106, the method determines a command based on the action performed by the controller of the multi-level command sensing apparatus. In block 2108, the method executes the command by the controller of the multi-level command sensing apparatus.

According to aspects of the present disclosure, the changes of light conditions may comprise a sequence of shadows detected on the display, and the action performed by the user may comprise a sequence of hovering motions without touching the display. The changes of light conditions may also comprise a sequence of brightened shadows detected on the display, and the action performed by the user may comprise a sequence of touches on the display. The sequence of brightened shadows can be caused by reflected light and scattered light from an object touching the display. The sequence of touches may include a sequence of low pressure touches predefined by the user. The sequence of touches may include a sequence of high pressure touches predefined by the user.

FIG. 21B illustrates a method of determining an action performed by a user based on changes of light conditions on a display according to aspects of the present disclosure. As shown in FIG. 21B, in block 2112, the method compares the changes of light conditions on the display to a set of predefined changes of light conditions stored in a database of the multi-level command sensing apparatus. In block 2114, the method identifies the action performed by the user corresponding to the changes of light conditions on the display in response to a match being found in the set of predefined changes of light conditions.

Figures 21C, 21D:
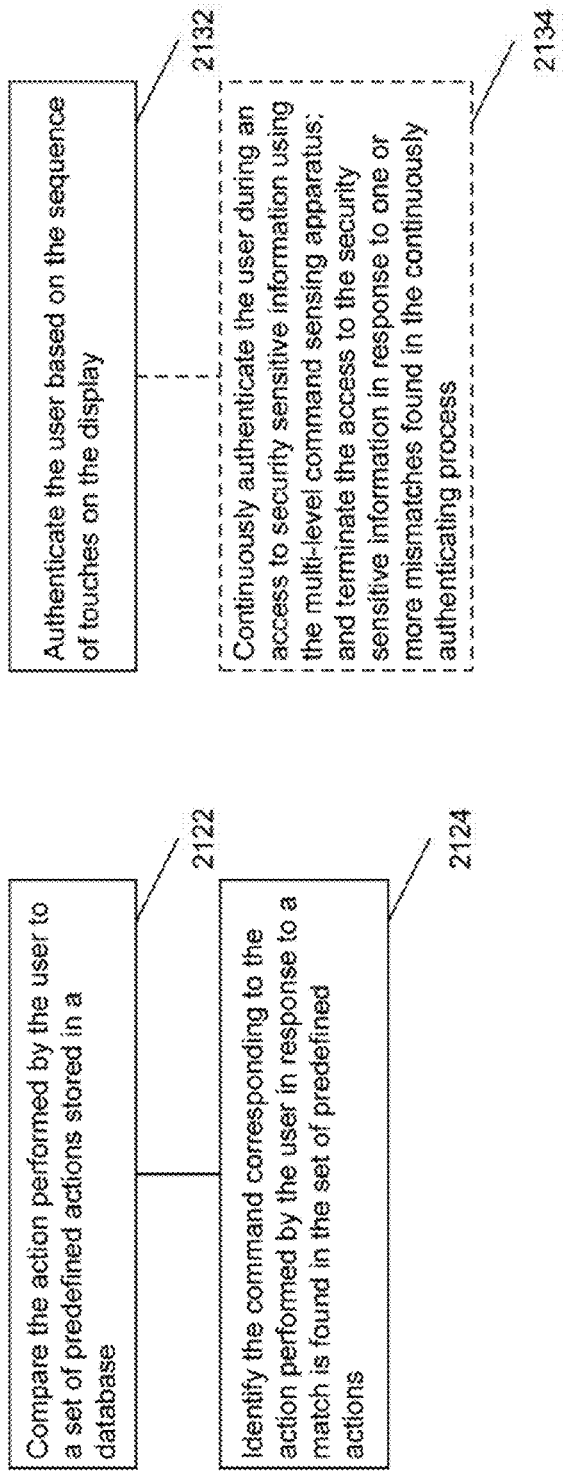

FIG. 21C illustrates determining a command based on the action performed by the user according to aspects of the present disclosure. As shown in FIG. 21C, in block 2122, the method compares the action performed by the user to a set of predefined actions stored in a database of the multi-level command sensing apparatus. In block 2124, the method identifies the command corresponding to the action performed by the user in response to a match being found in the set of predefined actions.

FIG. 21D illustrates a method of authenticating a user based on a sequence of touches on the display by the user according to aspects of the present disclosure. As shown in FIG. 21D, in block 2132, the method authenticates the user based on the sequence of touches on the display. Optionally (indicated by dotted lines) or additionally, the method may continuously authenticate the user during an access to security sensitive information using the multi-level command sensing apparatus, and terminate the access to the security sensitive information in response to one or more mismatches found in the continuously authenticating process.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for performing multi-level command sensing by a multi-level command sensing apparatus, comprising:
   detecting a leakage current corresponding to changes of light conditions on a display by one or more light sensors of the multi-level command sensing apparatus;
   converting the leakage current to a leakage voltage;
   determining an action performed by a user based on the changes of light conditions on the display according to changes of the leakage voltage by a controller of the multi-level command sensing apparatus;
   determining a command based on the action performed by the controller of the multi-level command sensing apparatus, wherein determining the command comprises comparing the action performed by the user to a set of predefined actions stored in a database of the multi-level command sensing apparatus, and identifying the command corresponding to the action performed by the user in response to a match being found in the set of predefined actions; and
   executing the command by the controller of the multi-level command sensing apparatus.

2. The method of claim 1:
   wherein the changes of light conditions comprise a sequence of shadows detected on the display, and wherein the action performed by the user comprises a sequence of hovering motions without touching the display.

3. The method of claim 1:
   wherein the changes of light conditions comprise a sequence of brightened shadows detected on the display, and wherein the action performed by the user comprises a sequence of touches on the display.

4. The method of claim 3:
   wherein the sequence of brightened shadows is caused by reflected light and scattered light from an object touching the display.

5. The method of claim 3, wherein the sequence of touches includes a sequence of low pressure touches predefined by the user.

6. The method of claim 3, wherein the sequence of touches includes a sequence of high pressure touches predefined by the user.

7. The method of claim 3, further comprising:
   authenticating the user based on the sequence of touches on the display.

8. The method of claim 7, wherein authenticating the user further comprises:
- continuously authenticating the user during an access to security sensitive information using the multi-level command sensing apparatus; and
- terminating the access to the security sensitive information in response to one or more mismatches found in the continuously authenticating process.

9. The method of claim 1, wherein determining the action performed by the user comprises:
- comparing the changes of light conditions on the display to a set of predefined changes of light conditions stored in a database of the multi-level command sensing apparatus; and
- identifying the action performed by the user corresponding to the changes of light conditions on the display in response to a match being found in the set of predefined changes of light conditions.

10. A multi-level command sensing apparatus, comprising:
- a display;
- one or more light sensors configured to detect a leakage current corresponding to changes of light conditions on the display;
- a controller comprising one or more processors, the controller is configured to:
- convert the leakage current to a leakage voltage;
- determine an action performed by a user based on the changes of light conditions on the display according to changes of the leakage voltage;
- determine a command based on the action performed, wherein the controller is further configured to compare the action performed by the user to a set of predefined actions stored in a database of the multi-level command sensing apparatus, and identify the command corresponding to the action performed by the user in response to a match being found in the set of predefined actions; and
- execute the command determined.

11. The multi-level command sensing apparatus of claim 10:
- wherein the changes of light conditions comprise a sequence of shadows detected on the display, and wherein the action performed by the user comprises a sequence of hovering motions without touching the display.

12. The multi-level command sensing apparatus of claim 10:
- wherein the changes of light conditions comprise a sequence of brightened shadows detected on the display, and wherein the action performed by the user comprises a sequence of touches on the display.

13. The multi-level command sensing apparatus of claim 12:
- wherein the sequence of brightened shadows is caused by reflected light and scattered light from an object touching the display.

14. The multi-level command sensing apparatus of claim 12, wherein the sequence of touches includes a sequence of low pressure touches predefined by the user.

15. The multi-level command sensing apparatus of claim 12, wherein the sequence of touches includes a sequence of high pressure touches predefined by the user.

16. The multi-level command sensing apparatus of claim 12, the controller is further configured to:
- authenticate the user based on the sequence of touches on the display.

17. The multi-level command sensing apparatus of claim 16, wherein the controller is further configured to:
- continuously authenticate the user during an access to security sensitive information using the multi-level command sensing apparatus; and
- terminate the access to the security sensitive information in response to one or more mismatches found in the continuously authenticating process.

18. The multi-level command sensing apparatus of claim 10, the controller is further configured to:
- compare the changes of light conditions on the display to a set of predefined changes of light conditions stored in a database of the multi-level command sensing apparatus; and
- identify the action performed by the user corresponding to the changes of light conditions on the display in response to a match being found in the set of predefined changes of light conditions.

* * * * *